United States Patent [19]
Honda

[11] Patent Number: 6,115,757
[45] Date of Patent: Sep. 5, 2000

[54] DMA CONTROL APPARATUS FOR MULTI-BYTE SERIAL-BIT TRANSFER IN A PREDETERMINED BYTE PATTERN AND BETWEEN MEMORIES ASSOCIATED WITH DIFFERENT ASYNCHRONOUSLY OPERATING PROCESSORS FOR A DISTRIBUTED SYSTEM

[75] Inventor: Takayoshi Honda, Nogoya, Japan

[73] Assignee: Denso Corporation, Kariya, Japan

[21] Appl. No.: 08/833,005

[22] Filed: Apr. 4, 1997

[30] Foreign Application Priority Data

Apr. 9, 1996 [JP] Japan .................................. 8-086483

[51] Int. Cl.$^7$ .......................... G06F 13/00; G06F 11/00; G06F 12/00; G06F 13/40
[52] U.S. Cl. .............................. 710/22; 710/23; 710/127; 364/242.31
[58] Field of Search .................................. 395/842, 843, 395/847, 307; 364/242.31, 238.1; 600/509; 710/22, 27, 127, 23

[56] References Cited

U.S. PATENT DOCUMENTS

| | | | |
|---|---|---|---|
| 3,916,388 | 10/1975 | Shimp et al. | 340/172.5 |
| 4,376,933 | 3/1983 | Saran et al. | 340/347 |
| 4,424,565 | 1/1984 | Larson | 364/200 |
| 4,467,447 | 8/1984 | Takahashi et al. | 710/27 |
| 4,716,527 | 12/1987 | Graciotti | 710/127 |
| 4,823,305 | 4/1989 | Holdren et al. | 364/900 |
| 5,187,783 | 2/1993 | Mansfield et al. | 395/425 |
| 5,371,736 | 12/1994 | Evan | 370/79 |
| 5,398,183 | 3/1995 | Elliott | 600/509 |
| 5,465,332 | 11/1995 | Deloye et al. | 710/22 |
| 5,499,383 | 3/1996 | Yamasaki | 710/22 |
| 5,550,987 | 8/1996 | Tanaka | 395/286 |
| 5,561,820 | 10/1996 | Bland et al. | 710/27 |
| 5,640,602 | 6/1997 | Takase | 395/855 |
| 5,655,151 | 8/1997 | Bowes et al. | 395/842 |
| 5,796,743 | 8/1998 | Bunting et al. | 370/474 |

FOREIGN PATENT DOCUMENTS

| | | |
|---|---|---|
| 4-314157 | of 0000 | Japan . |
| 5-173935 | of 0000 | Japan . |
| 5-46529 | of 0000 | Japan . |
| 7-13897 | of 0000 | Japan . |
| B2-5-29180 | of 0000 | Japan . |

*Primary Examiner*—Thomas C. Lee
*Assistant Examiner*—Tanh Quang Nguyen
*Attorney, Agent, or Firm*—Nixon & Vanderhye P.C.

[57] ABSTRACT

A DMA control apparatus transfers a data set of bytes, with no intermixing these data bytes and with favorable efficiency. A DMA controller receives data bytes serially and writes this data to a RAM. At this time, when the serially sent data are taken to be made up of data sets where one information item is formed of two bytes, the DMA controller, while temporarily storing data received in odd-numbered order in a data-set adjusting register, controls block write of this together with data received in even-numbered order to the RAM. Due to this, access where data other than these data sets is intermixed is eliminated, even in a case where asynchronous word-unit access of the RAM is performed by the CPU.

50 Claims, 20 Drawing Sheets

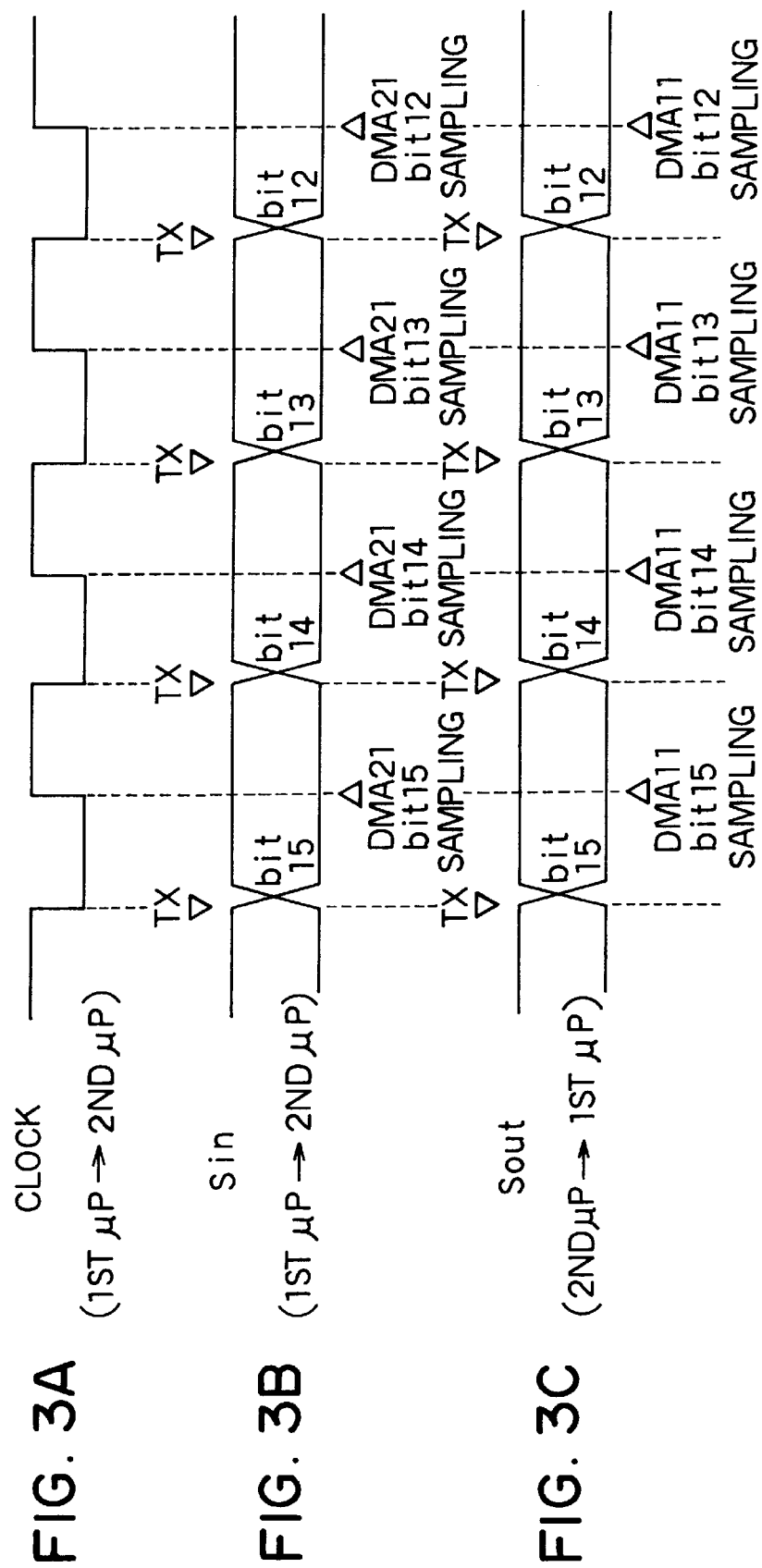

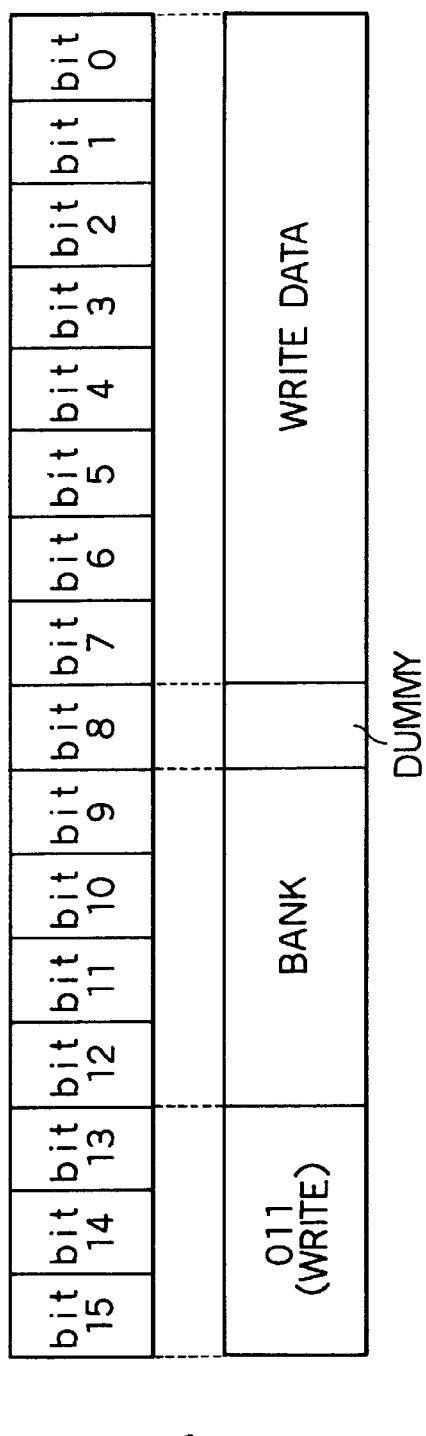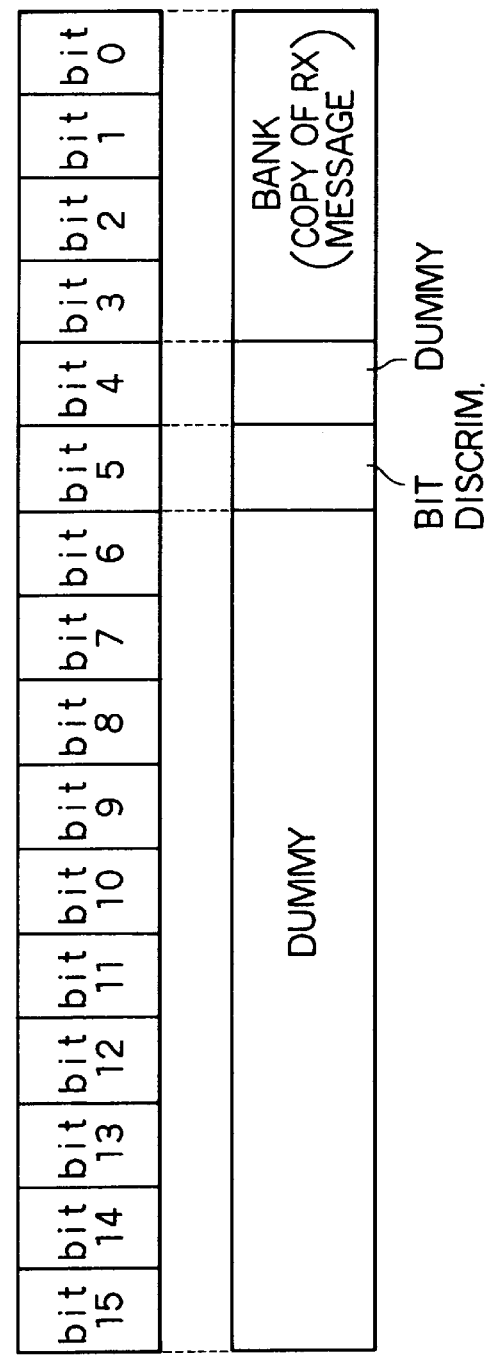
FIG. 5A
FIG. 5B

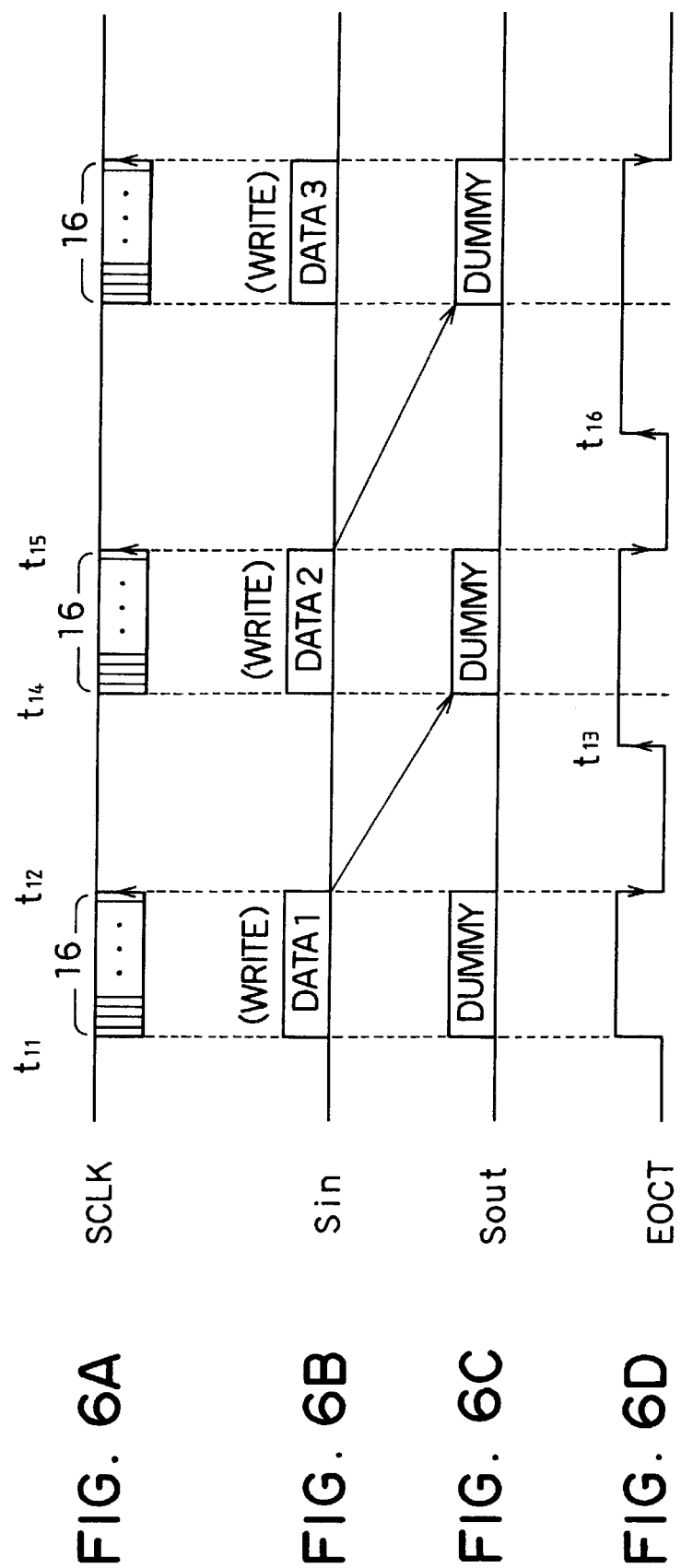

FIG. 7A

| bit 15 | bit 14 | bit 13 | bit 12 | bit 11 | bit 10 | bit 9 | bit 8 | bit 7 | bit 6 | bit 5 | bit 4 | bit 3 | bit 2 | bit 1 | bit 0 |
|---|---|---|---|---|---|---|---|---|---|---|---|---|---|---|---|
| 010 (READ) | | | BANK | | | | | DUMMY | | | | | | | |

FIG. 7B

| bit 15 | bit 14 | bit 13 | bit 12 | bit 11 | bit 10 | bit 9 | bit 8 | bit 7 | bit 6 | bit 5 | bit 4 | bit 3 | bit 2 | bit 1 | bit 0 |
|---|---|---|---|---|---|---|---|---|---|---|---|---|---|---|---|
| READ DATA | | | | | | | | | DUMMY | | BIT DISCRIM. | DUMMY | BANK | | |

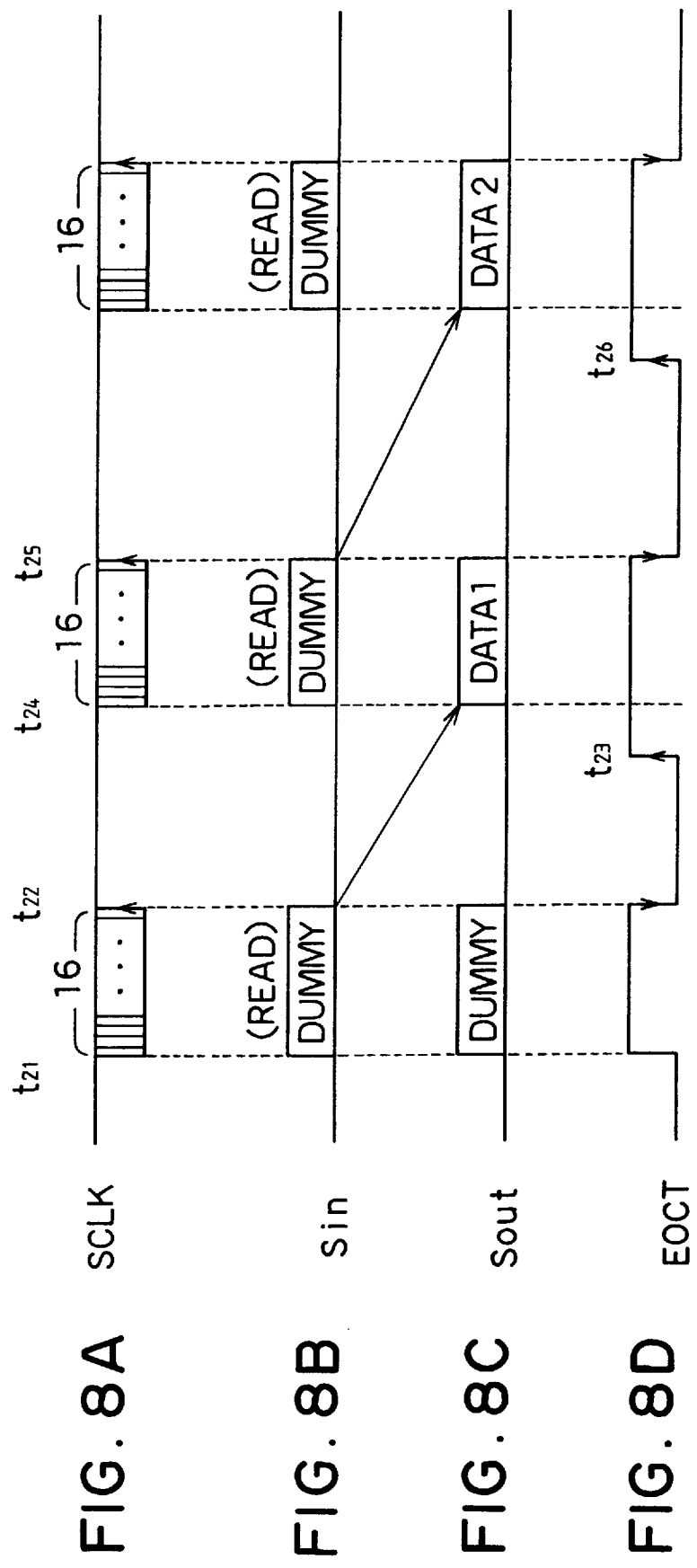

DMA CONTROL APPARATUS FOR MULTI-BYTE SERIAL-BIT TRANSFER IN A PREDETERMINED BYTE PATTERN AND BETWEEN MEMORIES ASSOCIATED WITH DIFFERENT ASYNCHRONOUSLY OPERATING PROCESSORS FOR A DISTRIBUTED SYSTEM

BACKGROUND OF THE INVENTION

1. Field of the Invention

This invention relates to a DMA (direct memory access) controller for controlling memory access of data exchanged among a plurality of processing units. More particularly, the invention relates to such a controller employed in engine control for controlling memory access of data exchanged among a plurality of electronic control units (ECUs). Further, the invention relates to a data-access structure effective in handling a data set where one item of information is formed by a plurality of data serially communicated with a predetermined byte unit.

2. Description of Related Art

Accompanying the recent strengthening of legal regulations such as exhaust-emissions regulations, reductions in fuel consumption, increased complexity of diagnostic processing, and the like surrounding engine control, a shift is occurring for an electronic control unit thereof from an orientation where all control and processing is performed collectively by a single electronic control unit to an orientation where this control and processing is distributed, i.e., functions are separated, and is performed by a plurality of electronic control units.

It may be noted that in a case where engine control is performed with division of functions by such a plurality of electronic control units, coolant-water temperature information, airflow information, rotational-speed information and the like detected by sensors disposed in various areas of the engine are taken into the respective electronic control units, and along with this, processing relating to fuel-injection quantity, ignition timing, and so on, as well as drive control and the like for corresponding actuators, are executed in accordance with these items of information by these electronic control units.

However, when these items of required information are read into each one of the foregoing electronic control units, the number of input ports is increased, leading to increased complexity of the input circuit.

In this regard, the prior art has devised methods such as reading information commonly required by these electronic control units into a single representative electronic control unit, and transferring this information to other electronic control units by a suitable communication process.

Accordingly, a DMA (direct memory access) control system which can directly access memory without inflicting an operational load on the CPUs of these control units is generally employed in such data communication among control units.

In a case where transfer of data from one electronic control unit to another electronic control unit is performed with this DMA control system, fundamentally, processing as described below is executed.

(1) The CPU of the sending electronic control unit activates a DMA controller thereof and instructs sending of desired data, such as map data.

(2) The activated DMA controller, while sequentially reading the corresponding data stored in a ROM (read-only memory) or a RAM (random-access memory) within the selfsame control unit, serially sends these data to a DMA controller of a receiving electronic control unit based on a shift clock. Attached to these data are an instruction to perform a write operation, along with respective write destinations thereof (i.e., bank information of the RAM in the receiving electronic control unit).

(3) The DMA controller of the receiving electronic control unit recognizes according to this received instruction that the data are write-instructed data, and writes the data to the similarly received write destinations (i.e., the specified banks in the RAM). In a case where a plurality of data having an identical write destination are transferred at this time, these data are written in sequence to the specified bank.

In such data transfer between electronic control units according to a DMA control system, master control of start, termination, and the like for serial communication ordinarily is given to the sending electronic control unit. Additionally, RAM access by the CPU in the receiving electronic control unit is executed asynchronously with respect to such RAM access by the DMA controller.

In serial communication according to the above-described DMA control system, data that can be transferred in one communication session are ordinarily data of one byte (eight bits). Consequently, in a case of attempting to send a data set where one information item is composed of data of two bytes, the same serial communication must be performed twice. Thus, in such a case, the DMA controller in the receiving electronic control unit also must access the same RAM twice.

Meanwhile, in a microprocessor making up the foregoing electronic control unit, RAM access by the CPU may be in units of one byte or in units of one word (i.e., two bytes= sixteen bits). These access units are determined as required in accordance with content of a program being executed by the CPU at that time.

However, because this RAM access by DMA control and RAM access by the CPU in the receiving electronic control unit are executed asynchronously as was described above, a problem such as is exemplified in FIG. 19 may occur, depending on the timing with which the RAM is accessed.

Namely, FIG. 19 shows a typical situation where immediately after a write of data 1 from a first microprocessor 1 making up a sending electronic control unit to a RAM 23 of a second microprocessor 2 making up a receiving electronic control unit was performed via a DMA controller 27, word-unit access of this RAM 23 was performed by a CPU 22 of the second microprocessor 2.

At this time, when the data written to the RAM 23 was, for example, a data set where one information item is made up of data of two bytes as was described above, the data that this CPU 22 fetches from the RAM 23 become a data set where updated "new data 1" and not-yet-updated "old data 2" are intermixed, as shown in FIG. 19. Accordingly, in a case such as where this data set is, for example, map data and these "new data" and "old data" are greatly changed, inconsistency may also occur in content controlled on a basis thereof.

Such a problem may occur also in a case where data transfer is performed among even more microprocessors via DMA controllers of differing processing speeds (i.e., communication speeds).

That is to say, as shown in FIG. 20, in a case such as where transfer of data from the first microprocessor 1 to the second microprocessor 2 via a DMA controller 28 having a slow processing speed is performed, and transfer of data from the second microprocessor 2 to a third microprocessor 3 via DMA controllers 29 and 31 having a fast processing speed is performed, the transfers of these data may be performed in circumstances described below:

(1) Updating of the data 1 is performed via the slow DMA controller 28 from the first microprocessor 1 to the RAM 23.

(2) Thereafter, before updating of the data 2 is performed, the updated "new data 1" and the not-yet-updated "old data 2" thereof are sequentially transferred from the RAM 23 to a RAM 33 by the fast DMA controllers 29 and 31.

Accordingly, in such a case, these "new data 1" and "old data 2" come to be stored, albeit temporarily, in the foregoing RAM 33.

Consequently, in a case such as where these data are a data set in which one information item is made up of data of two bytes, and moreover the CPU 32 as well performs word-unit access with respect to this RAM 33, here also some inconsistency may occur, similarly to the foregoing.

To be sure, there exist in the prior art as well known art techniques such as:

(1) In a data set where one information item is made up of data of two bytes, an index is furnished for each datum of one byte thereof, as disclosed in, for example, Japanese Patent Application Laid-Open Patent Publication No. Hei 7-13897.

(2) A data set where one information item is made up of data of a plurality of bytes is sandwiched between a start datum and an end datum, as disclosed in Japanese Patent Application Laid-Open Patent Publication No. Hei 5-173935, and so on, through which discrimination of these data sets is made possible.

However, in the former, an index must be furnished for each instance of data to be sent, and moreover, this furnished index must be referenced on the receiving end as well, and because of this, the processing load involved in data transfer is increased. Furthermore, with this technique, it is also not possible to handle what is known as "variable-length data" where, for example, a data set in which one information item is made up of data of two bytes and a data set in which one information item is made up of data of four bytes are transferred intermixed.

Meanwhile, in the latter, although the foregoing variable-length data can be handled, this technique also needs to furnish a start datum and an end datum for each one of these data sets, and this start datum and end datum must be checked on the CPU side, and processing load involved in data transfer increases. Additionally, in this case, there also exist restrictions in the data themselves, such not being able to use a value identical with this start datum or end datum.

SUMMARY OF THE INVENTION

In light of the above problems of the prior art, it is an object of this invention to provide a DMA control apparatus which can transfer even a data set where one information item is made up of data of a plurality of bytes, with no intermixing of these data, and moreover with favorable efficiency.

It is another object of this invention to provide a DMA control apparatus which can send even variable-length data reliably and moreover with favorable efficiency, with no need to furnish a start datum or end datum therefor.

The above objects are achieved according to a first aspect of the present invention by providing a DMA control apparatus for writing to a memory and for reading from a memory a data set where one information item is formed by a plurality of data serially communicated with a predetermined byte unit, where the control apparatus includes a data-set adjusting register into which data, a number thereof being the number of data making up the data set minus the serially communicated data, are temporarily loaded, and a control unit for block-accessing the memory with a data set being data loaded into this register and the serially communicated data.

In this way, during transfer of, for example, the above-mentioned data set in which one information item is made of up data of two bytes, the foregoing memory (ordinarily a RAM) is not accessed as a target for only one portion of the data making up the data set. That is, in a case of a data set such as this, block memory access is performed for this data set on condition that at least two portions of the data thereof are available.

Consequently, access with data other than these data sets does not occur, and problems such as inconsistent control are also solved, even in a case where asynchronous access in, for example, units of one word is performed with respect to the memory from the foregoing CPU or the like.

By using a structure such that when the data are serially communicated in units of one byte, and the data set is such that one information item is formed by data of two bytes, as in the example herein, the control unit, while temporarily loading data received in an odd order into the data-set adjusting register, it is possible to perform control to block-write these data together with data received in even order to the memory.

Processing for writing the data set to the memory may be accomplished with no intermixing of these data and moreover with favorable efficiency.

Additionally, by using a structure where the control unit block-reads the data set from the memory, and along with this, temporarily loads even-order data thereof into the data-set adjusting register, and after odd-order data have been sent, sends the loaded even-order data, processing for reading the data set from the memory is accomplished with no intermixing of these data and moreover with favorable efficiency in this case as well.

By using a structure where, along with the data-set adjusting register and the control unit, there are also added a byte-length memory where the number of data forming the data set is stored as byte-length information, and along with this, the control unit temporarily loads data of a number being the value stored in the byte-length memory minus 1 into the data-set adjusting register, and block-accesses the memory with a data set being the loaded data and the serially communicated data, block memory access for a data set of any number of bytes in length is performed on condition that the data thereof are available.

Consequently, access with data other than these data sets does not occur, and problems such as inconsistent control are also solved, even this also is a case where asynchronous access of the memory from the CPU or the like is performed in for example units of one word.

Additionally, in this case, according to a structure where further the byte-length information stored in the byte-length memory is a fixed value, block memory access is performed for the data set using an extremely simple structure in a system which performs data transfer in units of fixed byte length; alternatively, according to a structure where further the byte-length information stored in the byte-length memory is a value settable from an external area, flexible and favorably efficient memory access is performed even for data sets of the above-mentioned variable-length data.

Moreover, it is possible that the byte-length information stored in the byte-length memory is transferred prior to the serially communicated data, together with a suitable instruction as one of the serially communicated data and showing same, and whenever the byte-length information is received, the control unit updates and records it in the byte-length memory, the serial communication system can be used without modification to perform variable setting of the byte-length information even when no device is particularly provided for variably setting the byte-length information from an external area.

Furthermore, with this structure, it is sufficient to transfer the byte-length information only when varying the byte length of the data set to be transferred, and the processing load is greatly reduced at least in comparison with a case where a start datum and an end datum are furnished.

In this case, also, the data to be transferred and the byte-length information are not intermixed, because a separate instruction is furnished for sending the byte-length information. That is to say, no restriction at all is additionally placed on values that can be used as data.

When the data are serially communicated in units of one byte, and the byte-length information stored in the byte-length memory is n, where n is a natural number, by using a structure where further the control unit, while sequentially temporarily loading data received first up to nth−1 positions into the data-set adjusting register, block-writes these together with nth received data to the memory, processing for writing the data set to the memory is accomplished with no intermixing of these data and moreover with favorable efficiency in this case as well.

When the data are serially communicated in units of one byte, and the byte-length information stored in the byte-length memory is n, where n is a natural number, by using a structure where further the control unit, after block-reading a data set of n bytes from the memory together with temporarily loading second through nth position data thereof into the data-set adjustment register and sending first data thereof, sequentially sends the loaded second through nth data, processing for reading the data set from the memory is accomplished with no intermixing of these data and moreover with favorable efficiency, similarly to the foregoing.

Other objects and features of the present invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

FIGS. 3A–3C are graphs showing a data-fetch mode of the DMA controller in the embodiment;

FIGS. 5A and 5B are schematic diagrams showing an example of serial-data configuration during a data-write request according to this embodiment;

FIGS. 6A–6D are graphs showing a data-transfer mode during the data-write request according to the embodiment;

FIGS. 7A and 7B are schematic diagrams showing an example of serial-data configuration during a data-read request according to the embodiment;

FIGS. 8A–8D are graphs showing a data-transfer mode during the data-write request according to the embodiment;

FIG. 15 1 is a block diagram showing a second preferred embodiment of a DMA control apparatus according to the present invention;

DETAILED DESCRIPTION OF THE PRESENTLY PREFERRED EXEMPLARY EMBODIMENTS

Figure 1:
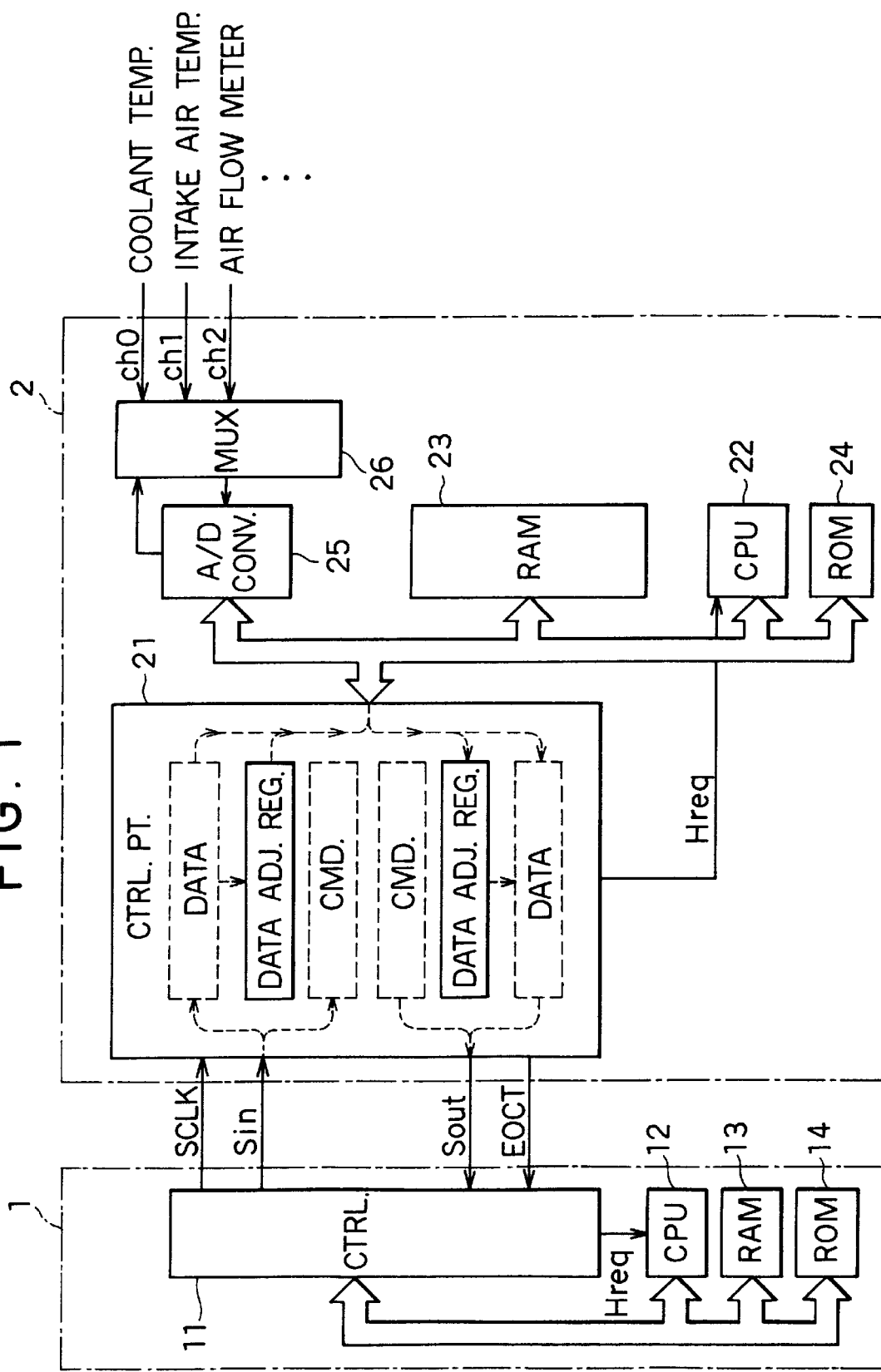
FIG. 1 is a block diagram showing a first embodiment of a DMA control apparatus according to the present invention.

FIG. 1 shows a first embodiment of a DMA (direct memory access) controller according to this invention.

During serial communication of data in units of one byte by the above-described DMA system, for example, in a multiple-CPU system for engine-control use, a device according to this first embodiment can perform writing or reading in memory without intermixing of these data, even in a case where a data set in which one information item is made of up data of two bytes is transferred.

Firstly, the overall structure of a multiple-CPU system for engine-control use according to a first preferred embodiment of the present invention will be described with reference to FIG. 1.

In this system, a first microprocessor 1 making up a main control unit of an engine control unit directly controls a running state of an engine (not illustrated), including control of the engine's fuel injection quantity, ignition timing, and the like.

Incorporated within the first microprocessor 1 are a DMA controller 11 for performing data communication according to the above-described DMA method with a second microprocessor 2 as an auxiliary control unit which will be described below, as well as a CPU 12 for computing fuel injection quantity, ignition timing, and so on as the foregoing controlled quantity, a RAM 13 employed chiefly as a data memory, a ROM 14 employed chiefly as a program memory, and the like.

Here, the DMA controller 11 is a device activated by the CPU 12 to transfer data stored in the RAM 13 on the ROM 14 to the second microprocessor 2, or to fetch required data from the second microprocessor 2.

In the period while this RAM 13 or this ROM 14 is being accessed by the DMA controller 11, a hold request Hreq is output to the CPU 12 from the DMA controller 11 so that conflicting accesses of these memories from the CPU 12 are not performed. The CPU 12 stands by and refrains from memory access and the like while the hold request Hreq is being output.

The CPU 12 assesses where and what type of data are stored, not only in the foregoing RAM 13 and ROM 14, but also in a RAM 23 which will be described later in the second microprocessor 2.

Meanwhile, the second microprocessor 2 as an auxiliary control unit fetches respective sensing data from various sensors (not illustrated) mounted on the engine, and chiefly executes auxiliary control such as, for example, knock control, load control, and the like.

Incorporated within this second microprocessor 2 are a DMA controller 21 for performing data communication with the DMA controller 11 of the first microprocessor 1, as well as a CPU 22 for computing control quantities for the foregoing knock control and load control, a RAM 23 employed chiefly as a data memory, a ROM 24 employed chiefly as a program memory, an A/D converter 25 for converting analog sensing data from a water-temperature sensor, intake-air temperature sensor, airflow meter, and the like to digital quantities, a multiplexer 26 to select data to be converted to a digital quantity, and the like.

Here, the DMA controller 21 is a device for performing memory access for reading or writing data in the RAM 23 along with activating the A/D converter 25 to perform A/D-conversion processing as well as to return a processing result thereof, based on an instruction received from the DMA controller 11. Details of these DMA controllers 11 and 21 as well as a communication structure of these data will be described later with reference to FIGS. 2 through FIG. 14.

In this second microprocessor 2 as well, in the period while the RAM 23 is being accessed by the DMA controller 21, a hold request Hreq is output to the CPU 22 from the DMA controller 21 so that conflicting accesses of the RAM 23 from the CPU 22 are not performed. The CPU 22 stands by and refrains from memory access and the like while the hold request Hreq is being output.

Additionally, in the second microprocessor 2, as described above, access of the RAM 23 by the CPU 22 is executed asynchronously with respect to access of the RAM 23 by the DMA controller 21.

The CPU 22 constantly assesses where and what type of data are stored in this RAM 23, and when required in the foregoing knock control, load control, or the like, reads or writes data required therein in the RAM 23.

Figure 2:
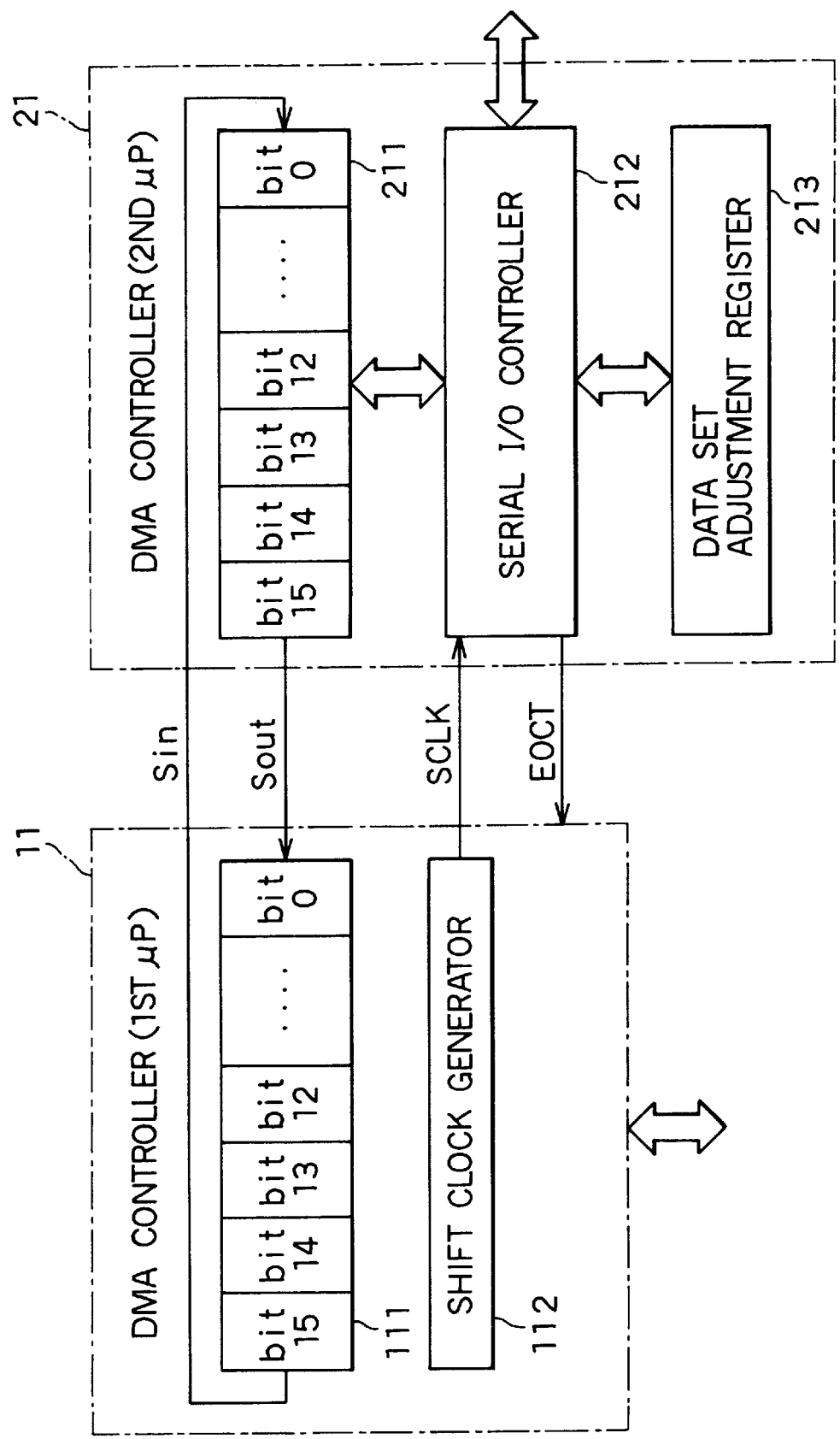
FIG. 2 is a block diagram showing a specific structure of a DMA controller according to the embodiment.

FIG. 2 shows a specific structure with regard to the DMA controller 11 and the DMA controller 21 of the device according to the first embodiment, and a data-processing structure in these DMA controllers will be described in greater detail below.

As shown in FIG. 2, the DMA controller 11 has a shift register 111 made up of sixteen stages, and a shift clock generator 112. The DMA controller 21 is provided similarly with a shift register 211 having sixteen stages, and with a serial I/O controller 212 and a data-set adjusting register 213.

Herein, these shifting registers 111 and 211 of the respective DMA controllers are connected in a loop state in a mode shown in FIG. 2, so that data is mutually exchanged according to a shift clock SCLK output from the shift clock generator 112 provided in the DMA controller 11.

That is to say, with each clock pulse of this shift clock SCLK, shifting activities described below are executed simultaneously with these shift registers 111 and 211:

(1) The most significant bit (bit 15) of the shift register 111 is transferred to the least significant bit (bit 0) of the shift register 211 (i.e., the serial receive signal Sin as seen from the DMA controller 21).

(2) The most significant bit (bit 15) of the shift register 211 is transferred to the least significant bit (bit 0) of the shift register 111 (i.e., the serial send signal Sout as seen from the DMA controller 21).

In a case of the example herein, the shift clock SCLK is output for sixteen clock pulses, and so the 16-bit data (messages) loaded into these shift registers 111 and 211 are all exchanged.

In FIGS. 3A–3C, a bit-data sampling mode of these DMA controllers 11 and 12 based on the shift clock SCLK is shown for reference.

As shown in FIGS. 3A–3C, in a device according to this embodiment, sending of the foregoing bit data aligned with the falling edge of the shift clock SCLK is performed, and sampling of the bit data aligned with the rising edge of the shift clock SCLK is performed.

In the DMA controller 11, an instruction which is an instruction requesting a data write to the RAM, an instruction requesting a data read from the RAM 23, an instruction requesting A/D conversion, or the like is included in the 16-bit message loaded to the shift register 111 in addition to the data normally made up of one byte (8 bits) which is the target of interchange.

Meanwhile, in the DMA controller 21, the serial I/O controller 212 decodes the foregoing instruction in the received data during serial-data exchange in so-called "handshaking" based on the shift clock SCLK, and executes access of the RAM 23 or the A/D converter 25.

The serial I/O controller 212 outputs an operation-complete signal EOCT to the DMA controller 11 (to be precise, a logic level thereof goes to a high logic level) at the time when these requested accesses have been completed and preparations according to the request such as loading the corresponding data to the shift register 211 have been accomplished. The DMA controller 11 determines from this output of the operation-complete signal EOCT from the serial I/O controller 212 that preparations have been accomplished, reactivates the shift clock generator 112, and sends the data loaded in the shift register 111 or fetches data to the shift register 111.

Specific examples of data communication executed in this system will be enumerated sequentially based on their correspondence with the content of requests according to the foregoing several instructions.

(A) Request for data write to RAM 23

Figure 4A:
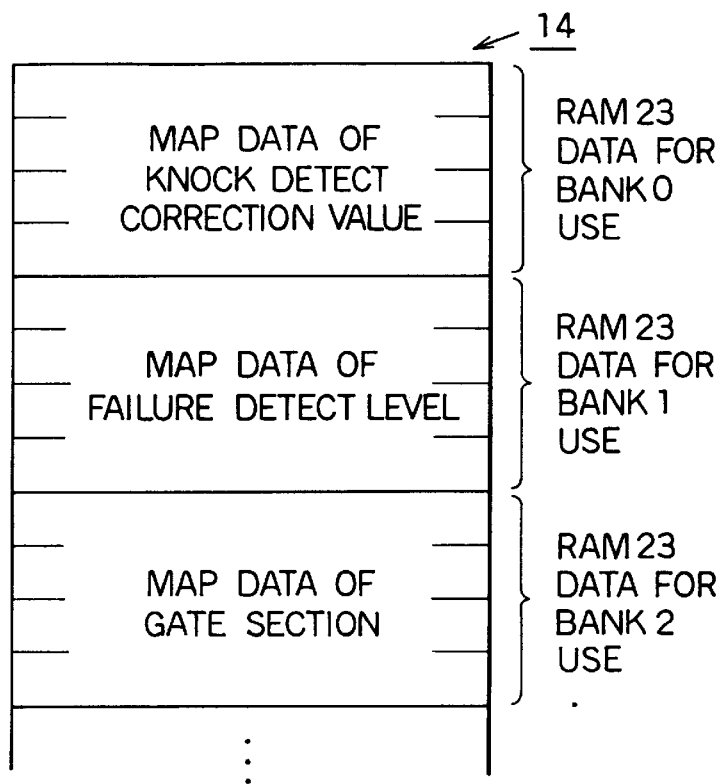
FIGS. 4A and 4B are schematic diagrams showing an example of data to be transferred by DMA control in this embodiment.
Figure 4B:
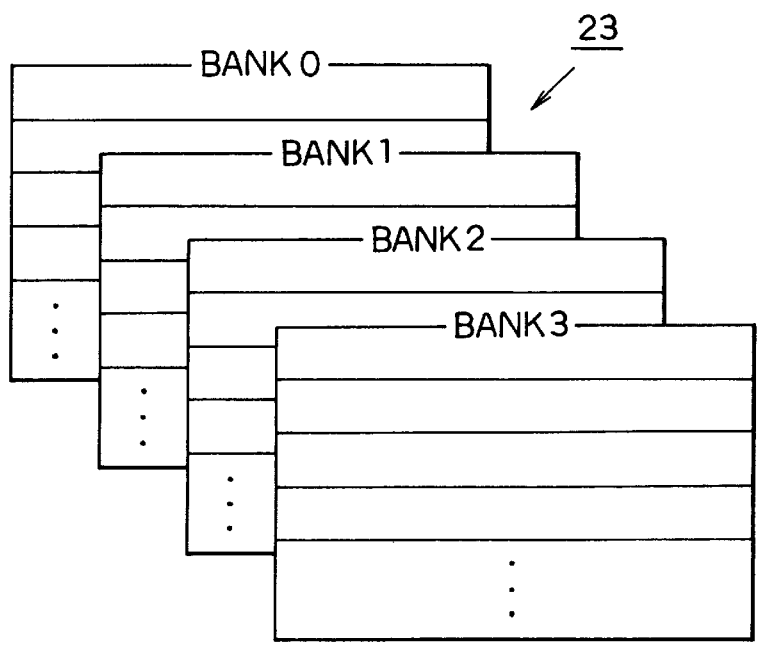

In this system, data for knock-control use as shown in FIGS. 4A and 4B, for example, may exist as data for which a write to the RAM 23 of the second microprocessor 2 making up the auxiliary control unit was requested from the first microprocessor 1 making up the engine control unit (main control unit).

That is, FIG. 4A shows a typical storage structure of knock-determination compensation-value map, failure-determination level map data, gate-interval map data, and so on, which have previously been stored in the ROM 14 of the first microprocessor 1. FIG. 4B shows a typical bank structure of the RAM 23 of the second microprocessor 2, which is the destination of transfer (i.e., the write destination) for these data.

In the same system, as is noted in FIG. 4A, among the previously-stored data in the ROM 14, the knock-determination compensation-value map data is written to bank 0 of the RAM 23, the failure-determination level map data is written to bank 1 of the RAM 23, and the gate-interval map data is written to bank 2 of the RAM 23. Bank 3 of the RAM 23 is written with, for example, the above-described data for load control or the like.

Additionally, in the foregoing data for knock control, the knock-determination compensation-value map data is data which has been mapped with respect to a compensation value used when determining engine knocking. The failure-determination level map data is data which has been mapped with respect to a reference value (i.e., a comparison value) used when performing severed-wire detection for a knock sensor (not illustrated). Ordinarily, during knock control, peak holding of the knock sensor output is performed, and vibration-suppressing control is conducted in correspondence with this peak-hold level. The gate-interval map data is data where this has been mapped with respect to the interval that this peak hold of knock sensor output is performed.

FIGS. 5A and 5B respectively show a data structure for serial data loaded in the foregoing shift register 111 through the DMA controller 11, and a data structure for serial data loaded in the foregoing shift register 211 through the DMA controller 21 at the time of such a request for writing data to the RAM 23.

That is, during the data-write request, a message having a data structure of write-request instruction "011" (bit 15 to bit 13), write-specified bank in the RAM 23 (bit 12 to bit 9), dummy datum (bit 8), and write data of the above-described several write data and the like (bit 7 to bit 0), and made up of the foregoing 16 bits, is sent from the DMA controller 11 as shown in FIG. 5A.

Meanwhile, sent from the DMA controller 21 which has received this message is a message having a data structure dummy data (bit 15 to bit 6), a discriminator bit showing whether the data write ended normally (bit 5), another dummy datum (bit 4), and a write bank in the RAM 23 (bit 3 to bit 0), and is made up of the foregoing 16 bits, as shown in FIG. 5B. Additionally, a copy of the "write-specified bank in the RAM 23" in bit 12 through bit 9 of the above-described received message is used as the "write bank in the RAM 23" (bit 3 to bit 0).

FIGS. 6A–6D show a data-transfer mode during the foregoing data-write request where messages having such data structures are exchanged by the DMA controller 11 and the DMA controller 21. Basic operation in the DMA controller 11 as well as the DMA controller 21 during a data-write request will be described below with reference also to FIGS. 6A–6D.

At the DMA controller 11, in this case, the message shown in FIG. 5A is previously loaded in the shift register 111 thereof based on an instruction from the CPU 12 described earlier; at the other DMA controller 21, the dummy datum is previously loaded in the shift register 211 thereof.

When the shift clock SCLK is assumed to have been issued from the DMA controller 11 side at time t11 while in this state (FIG. 6A), the signal EOCT first goes to a logical high on the initial falling edge of this clock SCLK (FIG. 6D), and along with this, the messages loaded to the respective shift registers 111 and 211 are exchanged in the mode shown previously in FIG. 2 and FIGS. 3A and 3B based on the output of sixteen clock cycles from this clock SCLK (FIG. 6B and FIG. 6C).

As a result of this, the shift register 211 of the DMA controller 21 receives first write data (data 1) made up of the above-described write-request instruction "011" as well as the write-specified bank within the RAM 23, the various map data, and the like.

At the serial I/O controller 212 of the DMA controller 21, it is determined based on the foregoing write-request instruction "011" contained in this received message that the message is a request for writing to the RAM 23, and after executing a predetermined action to comply with this request, such as writing the data 1 to a specified bank in the RAM 23, a reply message of the structure shown in FIG. 5B is loaded to the shift register 211. Thereafter, the above-described signal EOCT is raised to logical high level, informing the DMA controller 11 that processing has ended (time t13 in FIG. 6D), and the signal EOCT goes to logical low on the final rising edge of the shift clock SCLK (time t12).)

Meanwhile, it is determined at the DMA controller 11 that the prior request was fulfilled due to the signal EOCT rising to logical high as was described above. Then, after the write-request instruction "011," the write-specified bank within the RAM 23, and second write data (data 2) have been loaded to the shift register 111 with the data structure shown in FIG. 5A, the shift clock generator 112 is activated at time t14, and this message and the above-described reply message loaded to the shift register 211 are exchanged.

Thereafter, in the mode shown in FIGS. 6A–6D, processing corresponding to the foregoing is repeatedly executed through these DMA controllers 11 and 21 (time t15, time t16, . . . ).

(B) Request for data read from RAM 23

In this system, an operational value relating, for example, to a load state or the like due to the second microprocessor may exist as data for which a read from the RAM 23 of the second microprocessor 2 making up the auxiliary control unit was requested from the first microprocessor 1 making up the engine control unit (main control unit).

FIGS. 7A and 7B show respectively a data structure of serial data loaded in the above-described shift register 111 through the DMA controller 11 and a data structure of the serial data loaded in the above-described shift register 211 through the DMA controller 21 at the time of a request for data read from this RAM 23.

That is to say, during the data-read request, a message having a data structure of a read-request instruction "010" (bit 15 to bit 13), a read-specified bank in the RAM 23 (bit 12 to bit 9), and dummy data (bit 8 to bit 0), and made up of the foregoing 16 bits, is sent from the DMA controller 11, as shown in FIG. 7A.

Meanwhile, sent from the DMA controller 21 which has received this message is a message having a data structure of specified data to be read from the RAM 23 (bit 15 to bit 8), dummy data (bit 7 and bit 6), a discriminator bit showing whether the data read ended normally (bit 5), a dummy datum (bit 4), and a read bank in the RAM 23 (bit 3 to bit 0), and made up of the foregoing 16 bits, as shown in FIG. 7B. Additionally, a copy of the "read-specified bank in the RAM 23" in bit 12 through bit 9 of the above-described received message is used as the "read bank in the RAM 23" of bit 3 to bit 0.

FIGS. 8A–8D show a data-transfer mode during the foregoing data-read request where messages having such data structures are exchanged by the DMA controller 11 and the DMA controller 21. Basic operation in the DMA controller 11 as well as the DMA controller 21 during a data-read request will be described below with reference also to FIGS. 8A–8D.

At the DMA controller 11, in this case, the message shown in FIG. 7A is previously loaded in the shift register 111 thereof based on an instruction from the CPU 12 described earlier; at the other DMA controller 21, the dummy data is previously loaded in the shift register 211 thereof.

When the shift clock SCLK is assumed to have been issued from the DMA controller 11 side at time t21 while in this state (FIG. 8A), the signal EOCT firstly goes logically high on the initial falling edge of this clock SCLK (FIG. 8D), and along with this, the messages loaded in the respective shift registers 111 and 211 are exchanged in the mode shown previously in FIG. 2 and FIGS. 3A–3C based on the output of sixteen clock cycles from this clock SCLK (FIG. 8B and FIG. 8C).

As a result of this, the shift register 211 of the DMA controller 21 receives the above-described read-request instruction "010" as well as the read-specified bank within the RAM 23.

At the serial I/O controller 212 of the DMA controller 21, it is determined based on the foregoing read-request instruction "010" contained in this received message that the message is a request for reading from the RAM 23, and after executing a predetermined action to comply with this request, such as reading first read data (data 1) from a specified bank in the RAM 23, a reply message of the structure shown in FIG. 7B is loaded in the shift register 211. Thereafter, the above-described signal EOCT is raised to logic high level, informing the DMA controller 11 that processing has ended (time t23 in FIG. 8D), and the signal EOCT goes to logic low on the final rising edge of the shift clock SCLK (time t22).

Meanwhile, it is determined at the DMA controller 11 that the prior request was fulfilled, due to the signal EOCT rising to logical high, as was described above. Then, after the read-request instruction "010" and the read-specified bank within the RAM 23 have been loaded in the shift register 111 with the data structure shown in FIG. 7A, the shift clock generator 112 is activated at time t24, and this message and the above-described reply message loaded to the shift register 211 are exchanged. The read data (data 1) in this exchanged reply message is stored, via the DMA controller 11, in the RAM 13 of the first microprocessor.

Thereafter, in the mode shown in FIGS. 8A–8D, processing corresponding to the foregoing is repeatedly executed through these DMA controllers 11 and 21 (time t25, time t26, . . . ).

(C) A/D-conversion request

In this system, the first microprocessor 1 making up the engine control unit (main control unit) has no A/D converter such as was shown earlier in FIG. 1. For this reason, during the above-described control of fuel-injection quantity and ignition-timing control, in a case where it is necessary to fetch sensing data relating, for example, to coolant-water temperature or the like, an A/D conversion request is issued to the second microprocessor 2 making up the auxiliary control unit, and results of A/D conversion via the above-described A/D converter 25 are sent.

Figure 9A:
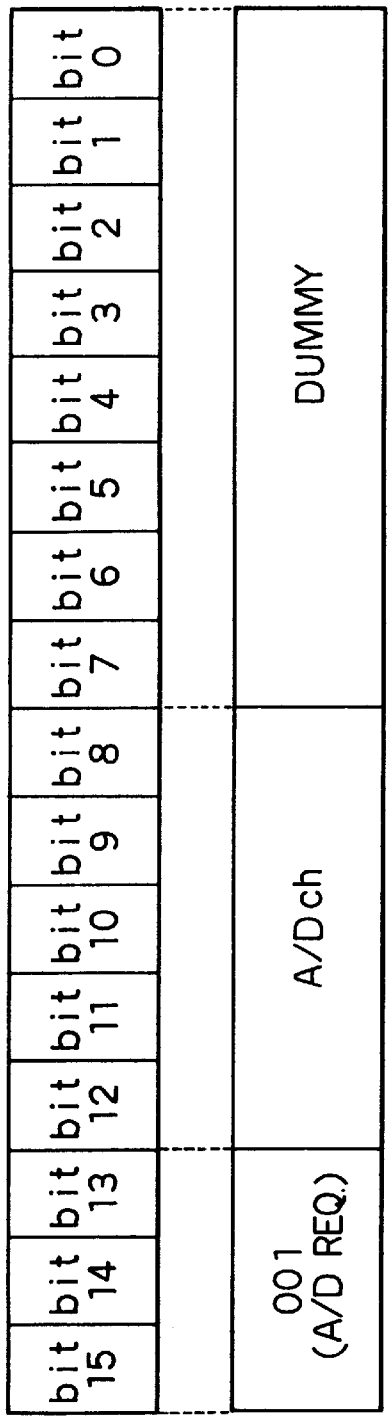
FIGS. 9A and 9B are schematic diagrams an example of serial-data configuration during an A/D-conversion request according to the embodiment.
Figure 9B:
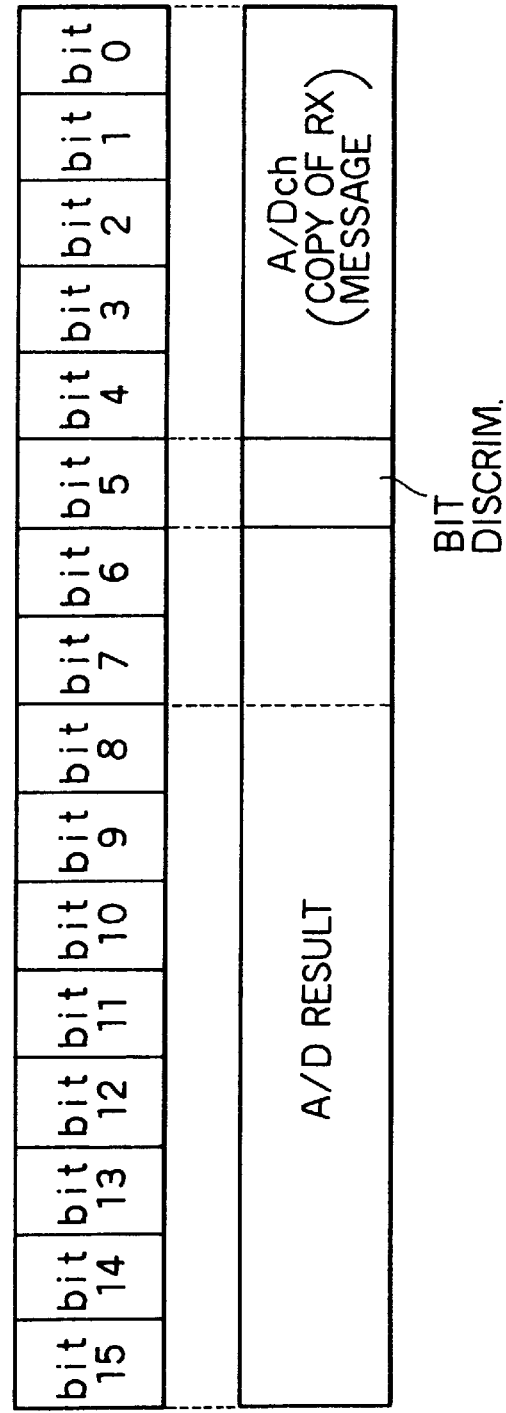

FIGS. 9A and 9B show respectively a data structure of serial data loaded in the above-described shift register 111 through the DMA controller 11 and a data structure of serial data loaded in the above-described shift register 211 through the DMA controller 21 at the time of such an A/D-conversion request.

That is, during the A/D-conversion request, a message having a data structure of an A/D-conversion request instruction "001" (bit 15 to bit 13), a specified channel for A/D conversion (bit 12 to bit 8), and dummy data (bit 7 to bit 0), and made up of the foregoing 16 bits is sent from the DMA controller 11, as shown in FIG. 9A.

Meanwhile, sent from the DMA controller 21 which has received this message is a message having a data structure of A/D-conversion results (bit 15 to bit 8 or to bit 6), dummy data (bit 7 and bit 6), a discriminator bit showing whether the A/D conversion ended normally (bit 5), and a specified A/D-conversion channel (bit 4 to bit 0), and made up of the foregoing 16 bits, as shown in FIG. 9B. Furthermore, the foregoing "A/D-conversion results" are able to support data of two types, namely data made up of 8 bits (bit 15 to bit 8) and data made up of 10 bits (bit 15 to bit 6). Here as well, a copy of the "specified channel for A/D conversion" in bits 12 through 8 of the above-described received message is used as the "specified A/D-conversion channel (ch)" of bits 4 to 0.

FIGS. 10A–11D show a data-transfer mode during an A/D-conversion request where messages having such data structures are exchanged by the DMA controller 11 and the DMA controller 21. The basic operation in the DMA controller 11 as well as the DMA controller 21 during an A/D-conversion request will be described below with reference also to FIGS. 10A–10D.

At the DMA controller 11, in this case, the message shown in FIG. 9A is previously loaded in the shift register 111 thereof based on an instruction from the CPU 12 described earlier. At the other DMA controller 21, the dummy data is previously loaded in the shift register 211 thereof.

Figures 10A, 10B, 10C, 10D:
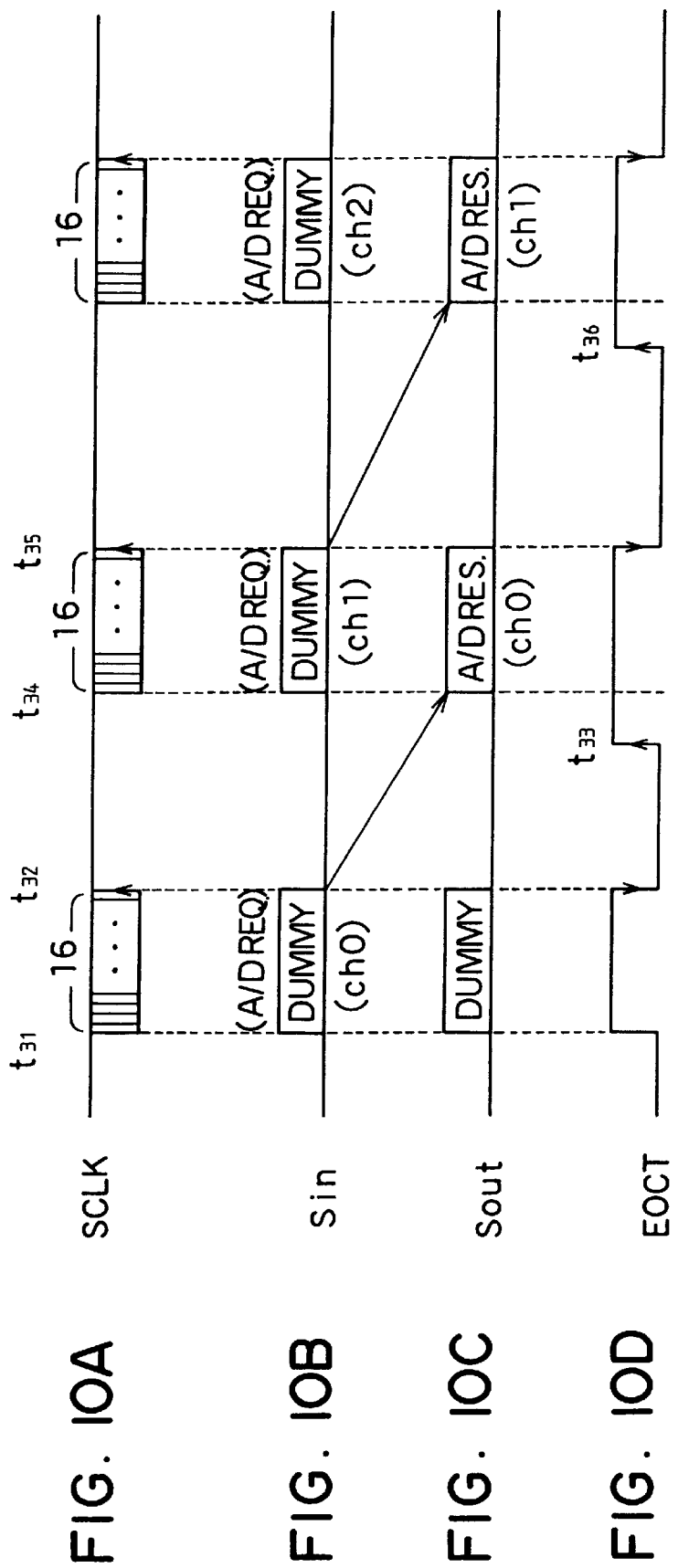
FIGS. 10A–10D are graphs showing a data-transfer mode during the A/D-conversion request according to the embodiment.

When the shift clock SCLK is assumed to have been issued from the DMA controller 11 side at time t31 while in this state (FIG. 10A), the signal EOCT first goes to a logical high on the initial falling edge of this clock SCLK (FIG. 10D), and along with this, the messages loaded to the respective shift registers 111 and 211 are exchanged in the mode shown previously in FIG. 2 and FIGS. 3A–3C based on the output of sixteen clock cycles from this clock SCLK (FIG. 10B and FIG. 10C).

As a result of this, the shift register 211 of the DMA controller 21 receives the above-described A/D-conversion request instruction "001" as well as the specified channel for A/D conversion.

At the serial I/O controller 212 of the DMA controller 21, it is determined based on the foregoing A/D-conversion request instruction "001" contained in this received message that the message is an A/D-conversion request, and after executing a predetermined action to comply with this request, such as activating the A/D converter 25, performing A/D-conversion on the specified channel thereof (ch 0), and fetching the results thereof, a reply message of the structure shown in FIG. 9B is loaded in the shift register 211. Thereafter, the above-described signal EOCT is raised to a logical high level, informing the DMA controller 11 that processing has ended (time t33 in FIG. 1D), and the signal EOCT goes to logical low on the final rising edge of the shift clock SCLK (time t32).

Meanwhile, it is determined at the DMA controller 11 that the previous request was fulfilled due to the signal EOCT rising to logical high as described above. Then, after the A/D-conversion request instruction "001" and the specified channel for A/D conversion have been loaded in the shift register 111 with the data structure shown in FIG. 9A, the shift clock generator 112 is activated at time t34, and this message and the above-described reply message loaded in the shift register 211 are exchanged. The above-described A/D-conversion results (i.e., channel-0 data) in this exchanged reply message is stored via the DMA controller 11 in the RAM 13 of the first microprocessor.

Thereafter, in the mode shown in FIGS. 10A–10D, processing corresponding to the foregoing is repeatedly executed through these DMA controllers 11 and 21 (time t35, time t36, . . . ).

It may be noted that among these examples of processing, data which can be transferred in one transmission thereof is 1 byte (8 bits), as was described earlier, particularly in the "request for data write to RAM 23" of (A) and the "request for data read from RAM 23" of (B). For this reason, as was stated earlier, the same serial transmission must be executed twice in a case of attempting to transfer for example a data set in which one information item is made of up data of two bytes.

With the second microprocessor 2 making up the auxiliary control unit, however, it was described above that access of the RAM 23 by the CPU 22 may also be by word (2 bytes=16 bits), and moreover that access of the RAM 23 by this CPU 22 is carried out asynchronously with respect to access of the RAM 23 by the DMA controller 21.

Consequently, although multiple accesses of the RAM 23 by the CPU 22 using the hold request Hreq described above are restricted in this second microprocessor 2, in a case such as where word-unit access of the RAM 23 by the CPU 22 was performed immediately after, for example, the first data (data 1) was written to the RAM 23 by the DMA controller 21, i.e., immediately after this hold request Hreq was canceled once, a problem such as was described in connection with FIG. 19 occurs, as is to be expected.

In this regard, the device according to this embodiment provides a data-set adjusting register 213 in the DMA controller 21, as was shown earlier in connection with FIG. 2, so as to avoid intermixing of these data through this data-set adjusting register 213.

Figure 11:
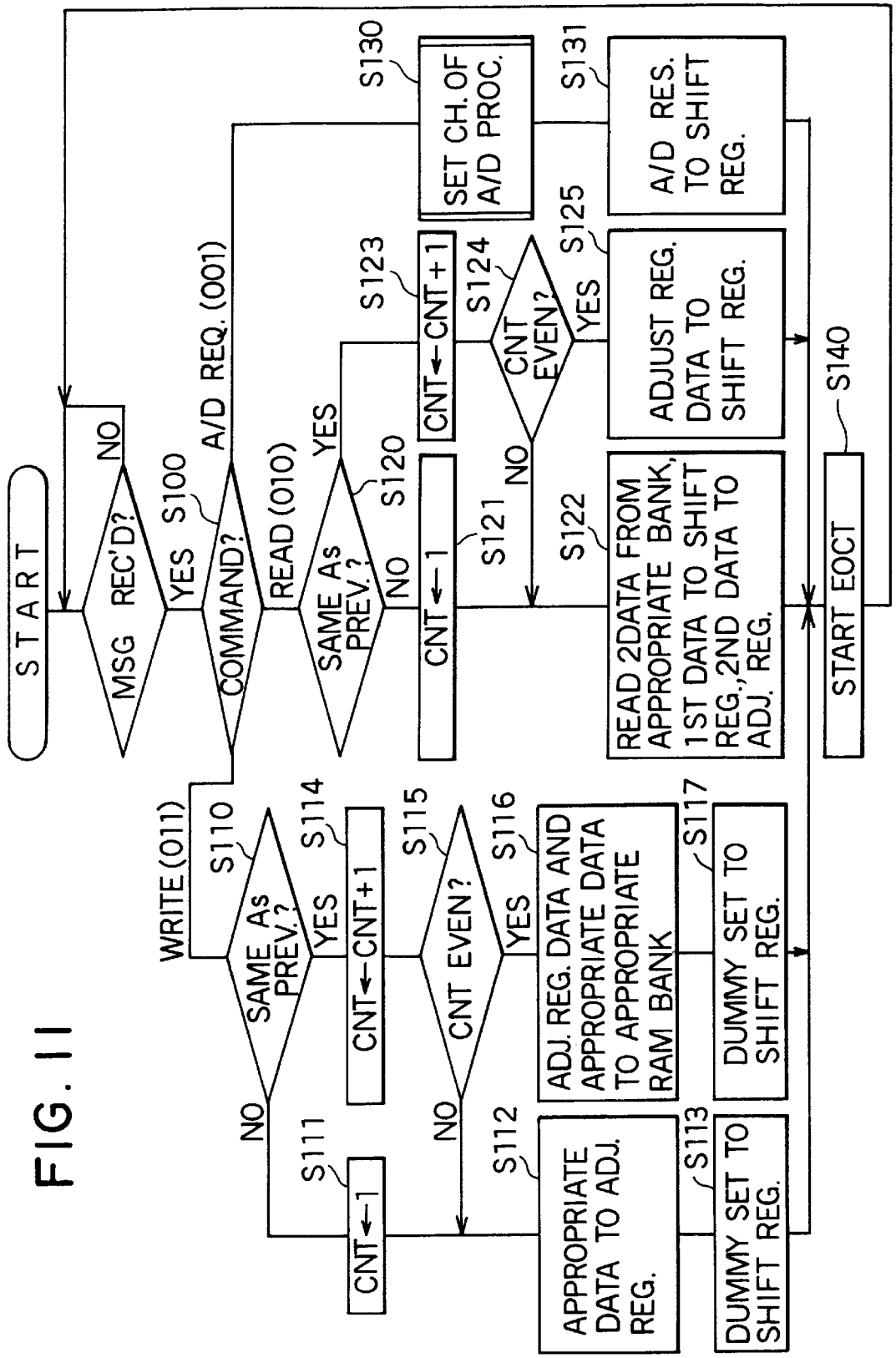
FIG. 11 is a flowchart showing an I/O control routine of the DMA controller in this embodiment.

FIG. 11 shows an I/O control routine (actually, processing equivalent to this is achieved by logical operations of hardware) executed via the above-mentioned serial I/O controller 212 of this DMA controller 21, and a data-transfer configuration in the DMA control apparatus according to this embodiment will be described in greater detail below with reference also to FIG. 11.

As shown in FIG. 11, the serial I/O controller 212 constantly monitors the presence or absence a received message from the DMA controller 11 based on the state of the shift clock SCLK. Accordingly, when this received message arrives, in Step S100 an instruction contained therein (the most significant 3 bits) is decoded, and based on the decoded instruction, processing of Step S110 and thereafter, of Step S120 and thereafter, or of Step S130 and thereafter is executed in correspondence with the above-described (A) Request for data write to RAM 23, (B) Request for data read from RAM 23, or (C) A/D-conversion request.

Namely, when the decoded instruction is taken to be a "request for data write to the RAM 23 (011)," in Step S110 the serial I/O controller 212 first determines whether the specified bank is identical to the bank specified in the previous instance.

In a case where the specified bank has been determined as a result of this not to be identical to the bank specified in the previous instance, the serial I/O controller 212 sets a value of "1" to a counter CNT incorporated therein (Step S111), and temporarily loads data contained in the message to the data-set adjusting register 213 (Step S112).

Thereafter, dummy data are loaded into the shift register 211 (step S113), the operation-complete signal EOCT goes high (Step S140), and this processing ends for the time being.

Meanwhile, when the specified bank is determined as a result of the foregoing specified-bank comparison to be identical to the bank specified in the previous instance, the serial I/O controller 212 increments the value of the counter CNT with a mode of "CNT<–CNT+1" (Step S114).

Accordingly, it further is determined whether the value of this incremented counter CNT is odd or even (Step S115), and in a case where it is odd, processing is transferred to the foregoing Step S112. That is, the data contained in the message are temporarily loaded into the data-set adjusting register 213 and the dummy data are loaded to the shift register 211, and thereafter the operation-complete signal EOCT goes high and this processing ends for the time being.

Meanwhile, when the value of the counter CNT is even, the data loaded into the data-set adjusting register 213 at that time and the data included in the message are block-written to the specified bank of the RAM 23 (Step S116).

Thereafter, similarly, dummy data are loaded to the shift register 211 (Step S117), the operation-complete signal EOCT goes high (Step S140), and this processing is ended for the time being.

By repeating such write control via the DMA controller 21, each continuous odd-numbered byte data and even-numbered byte data among data making up, for example, the map data shown in FIGS. 4A and 4B are always written to the RAM 23 as 2-byte pairs of data.

Figure 12:
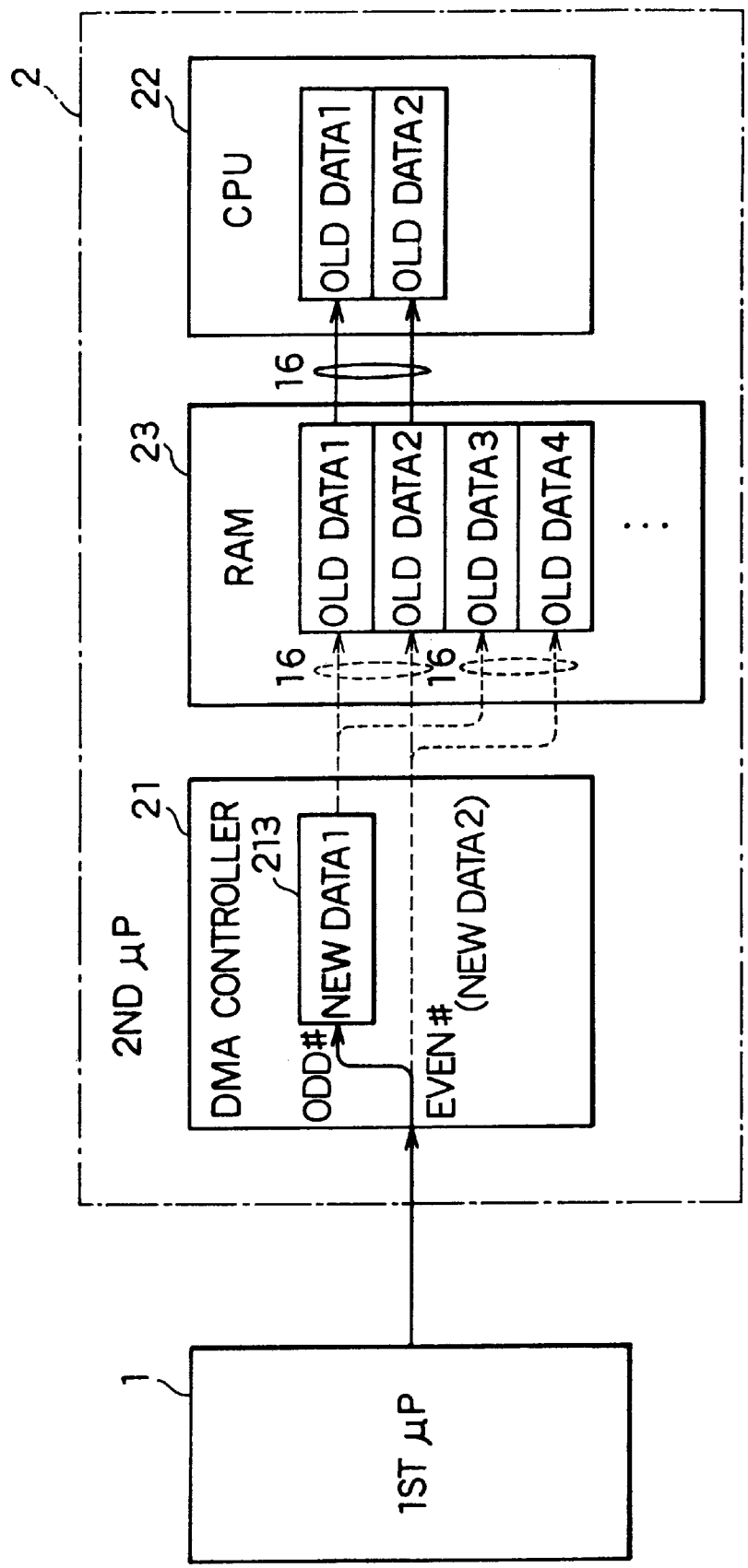
FIG. 12 is a schematic showing a typical data-write mode according to this I/O control.

For this reason, even when word-unit access of the RAM 23 from the CPU 22 was performed immediately after transfer of "new data 1" which is odd-numbered data has ended, for example, as is shown typically in FIG. 12, the word-length data sent to the CPU 22 all remain "old data." Consequently, even when control based at least on these word data is performed, no major inconsistency occurs in this control.

Figure 13:
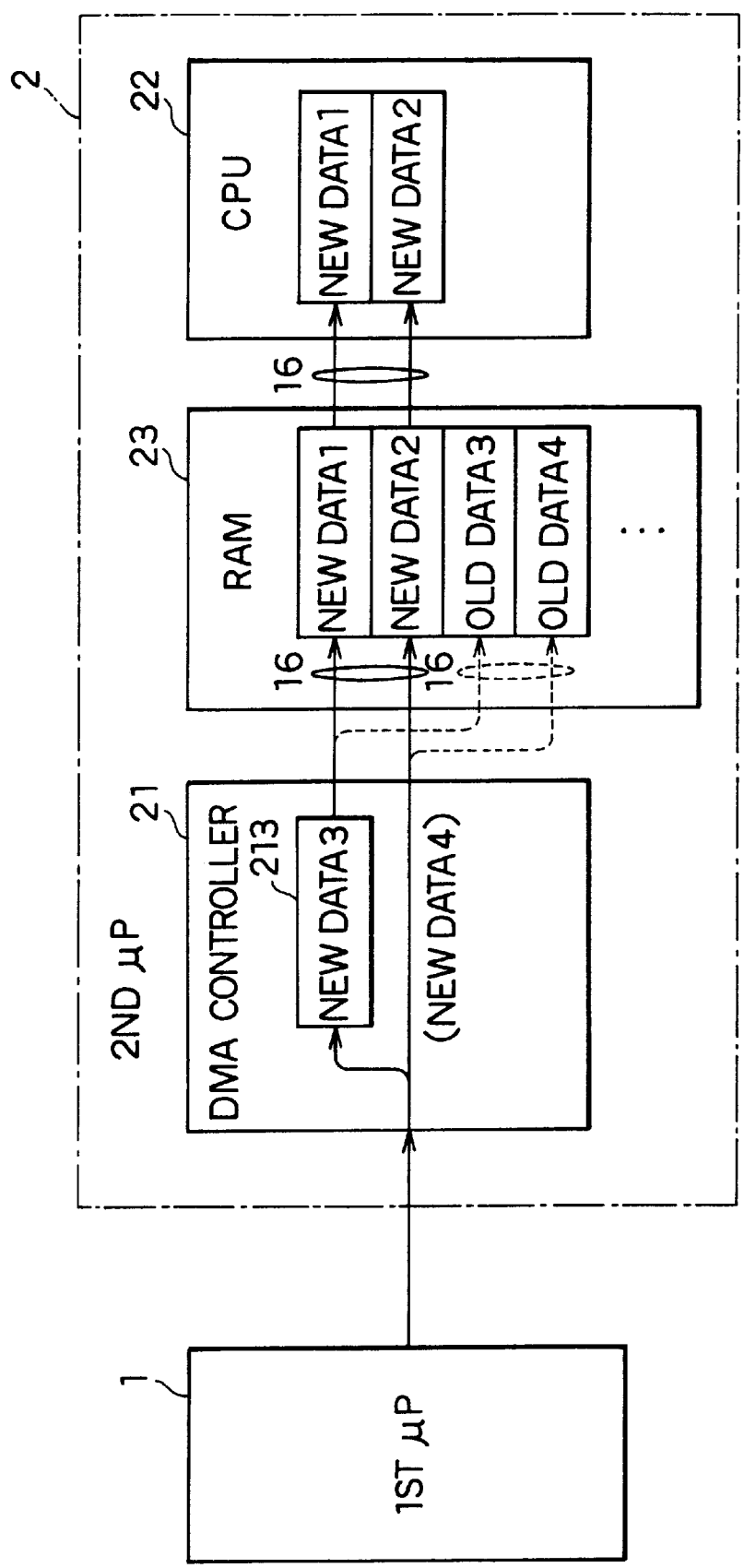
FIG. 13 is a schematic showing a typical data-write mode according to this I/O control.

Additionally, when after the ending of transfer of "new data 2" which is even-numbered data, these "new data 1" and "new data 21" for forming pairs always exist simultaneously in the RAM 23, for example, as shown in FIG. 13. Consequently, when the CPU 22 has performed word-unit access of the RAM 23, the word-length data fetched to the CPU 22 are all "new data." At this time, control based on these "new data" is of course executed normally.

Returning now to FIG. 11, when in the I/O control routine the above-described decoded instruction is taken to be a "request for data read from the RAM 23 (010)," in Step S120 the serial I/O controller 212 determines whether the bank specified therewith is identical to the bank specified in the previous instance.

In a case where the specified bank has been determined as a result of this not to be identical to the bank specified in the previous instance, the serial I/O controller 212 sets a value of "1" to the counter CNT incorporated therein (Step S121). Thereafter, two continuous bytes of data are read from the relevant bank in the RAM 23 on a basis of the specified bank contained in the message; the first (i.e., odd-numbered) data are loaded to the shift register 211, and the second (i.e., even-numbered) data are temporarily loaded into the above-described data-set adjusting register 213 (Step S122).

Thereafter, the operation-complete signal EOCT goes high (Step S140), and this processing ends for the time being.

Meanwhile, in a case where the specified bank is determined as a result of the foregoing specified-bank comparison to be identical to the bank specified in the previous instance, the serial I/O controller 212 increments the value of the counter CNT with a mode of "CNT<-CNT+1" (Step S123).

Accordingly, it further is determined whether the value of this incremented counter CNT is odd or even (Step S124); in a case where it is odd, processing is transferred to the above-mentioned Step S122. That is to say, two continuous bytes of data are read from the relevant bank in the RAM 23 on a basis of the specified bank contained in the message; the first (i.e., odd-numbered) data are loaded in the shift register 211 and the second (i.e., even-numbered) data are temporarily loaded in the data-set adjusting register 213, and thereafter the operation-complete signal EOCT goes high and this processing ends for the time being.

Meanwhile, in a case where the value of the counter CNT was even, the data loaded into the data-set adjusting register 213 at that time are loaded to the shift register 211 (Step S125).

Thereafter, similarly, the operation-complete signal EOCT goes high (Step S140), and this processing ends for the time being.

Figure 14:
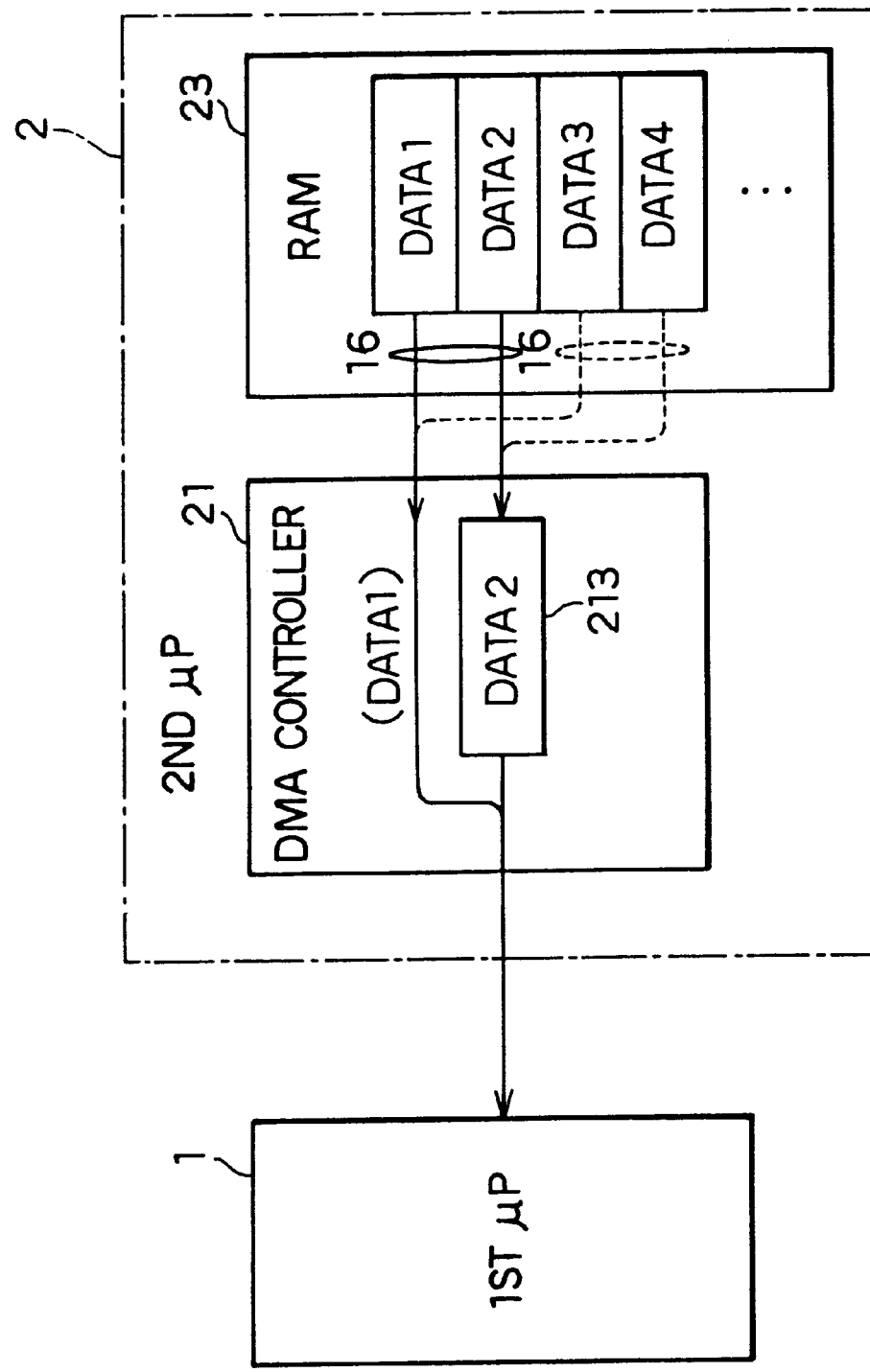
FIG. 14 is a schematic showing a typical data-read mode according to this I/O control.

By repeating such read control via the DMA controller 21, each continuous odd-numbered byte data and even-numbered byte data among the data stored in the RAM 23 are always read from the RAM 23 as 2-byte pairs of data, for example, as shown in FIG. 14. Consequently, no inconsistency occurs in these read data even in a case where these continuous 2-byte data are simultaneously rewritten, for example, by word-unit access of the CPU 22.

In a case where in the I/O control routine of FIG. 11 the above-described decoded instruction is taken to be an "A/D-conversion request (001)," in Step S130 the serial I/O controller 212 selects the specified A/D-conversion channel (ch), and activates the A/D converter 25. Thereafter, the A/D-conversion results thereof are loaded to the shift register 211 (Step S131), the operation-complete signal EOCT goes high (Step S140), and this processing is ended for the time being. In this case, the data-set adjusting register 213 is not employed.

As has been described above, numerous superior effects are demonstrated by a DMA control apparatus according to this embodiment, such as:

(a) When sending a data set where one information item is composed of data of 2 bytes, the RAM 23 is not accessed when only one of the data making up the data set is accessed. That is, in a case of such a data set, block memory access of the data set is performed on condition that at least two of these data are available.

(b) Moreover, because of this, access with intermixing of data other than those of the data set is eliminated and problems such as performance of inconsistent control also are spontaneously solved, even in a case where asynchronous access of the RAM 23 of, for example, word length is performed from the CPU 22.

(c) Still further, even several continuous byte-length data among data stored in the RAM 23 are always read from the RAM 23 as a 2-byte pair of data. Consequently, no inconsistency occurs in these read data even in a case where these continuous 2-byte data are simultaneously rewritten, for example, by word-unit access of the CPU 22.

(d) Moreover, no modification of any type need be made in these exchanged messages themselves to achieve such favorable data transfer.

Additionally, as is clear from the I/O control routine shown in FIG. 11, in the device according to this embodiment the above-described data set is presumed to be made up of data of an even number of bytes. For this reason, at the time of, for example, a request to write data to the RAM 23, the data of a data set made up of an even number of bytes can all be written to the RAM 23, but in a case of a data set made up of an odd number of bytes, or in a case such as where even-numbered data was not sent due to transmission error or the like, the final datum or the datum immediately prior to the datum subjected to transmission error is discarded (i.e., overwritten) in the data-set adjusting register 213. However, it should be noted that even in a case such as this, such a problems can be solved by jointly employing a control method where a dummy datum is separately transferred as the even-numbered datum, and when the instruction or the specified bank differs from the previous message, a forced write of the data loaded into the data-set adjusting register 213 to the bank specified up to then in the RAM 23 is performed, irrespectively of whether the message is made up of even-numbered data, or the like.

(Second Embodiment)

Figure 15:
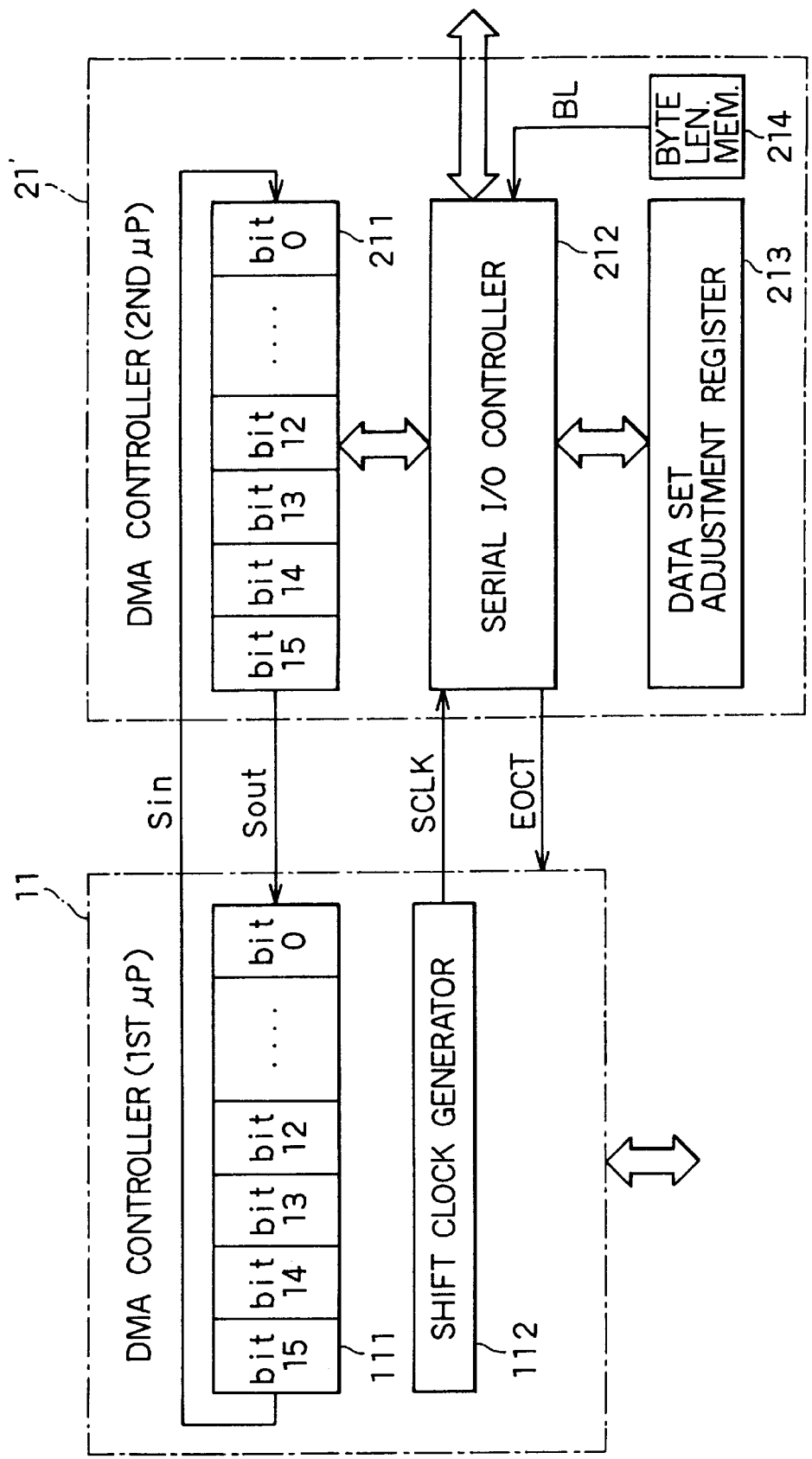

FIG. 15 shows a second preferred embodiment of a DMA controller according to this invention.

Like the first embodiment, this second is also structured as a device which can appropriately achieve DMA transfer of a data set where one information item is made up of data of a plurality of bytes, for example, in a multiple-CPU system for engine-control use. However, in the device of this second embodiment, a DMA controller on an auxiliary control unit (second microprocessor 2) side is able to handle also the variable-length data which was described above.

The structure and data-transfer configuration of the device according to the second embodiment will be described in detail below with focus on points of difference with the above-described device of the first embodiment.

In the device according to the second embodiment, as shown in FIG. 15, a DMA controller 21' disposed in a second microprocessor is provided with a byte-length memory 214 in addition to the above-described data-set adjusting register 213.

This byte-length memory 214 stores information showing the number of bytes making up a data set transferred between a DMA controller 11 for a first microprocessor and this DMA controller 21', i.e., byte-length information BL of the data set.

In a case of the DMA controller 21', a serial I/O controller 212 also references the byte-length information BL stored in the byte-length memory 214, and executes operation of the data-set adjusting register 213 along with access of a RAM 23.

Figure 16:
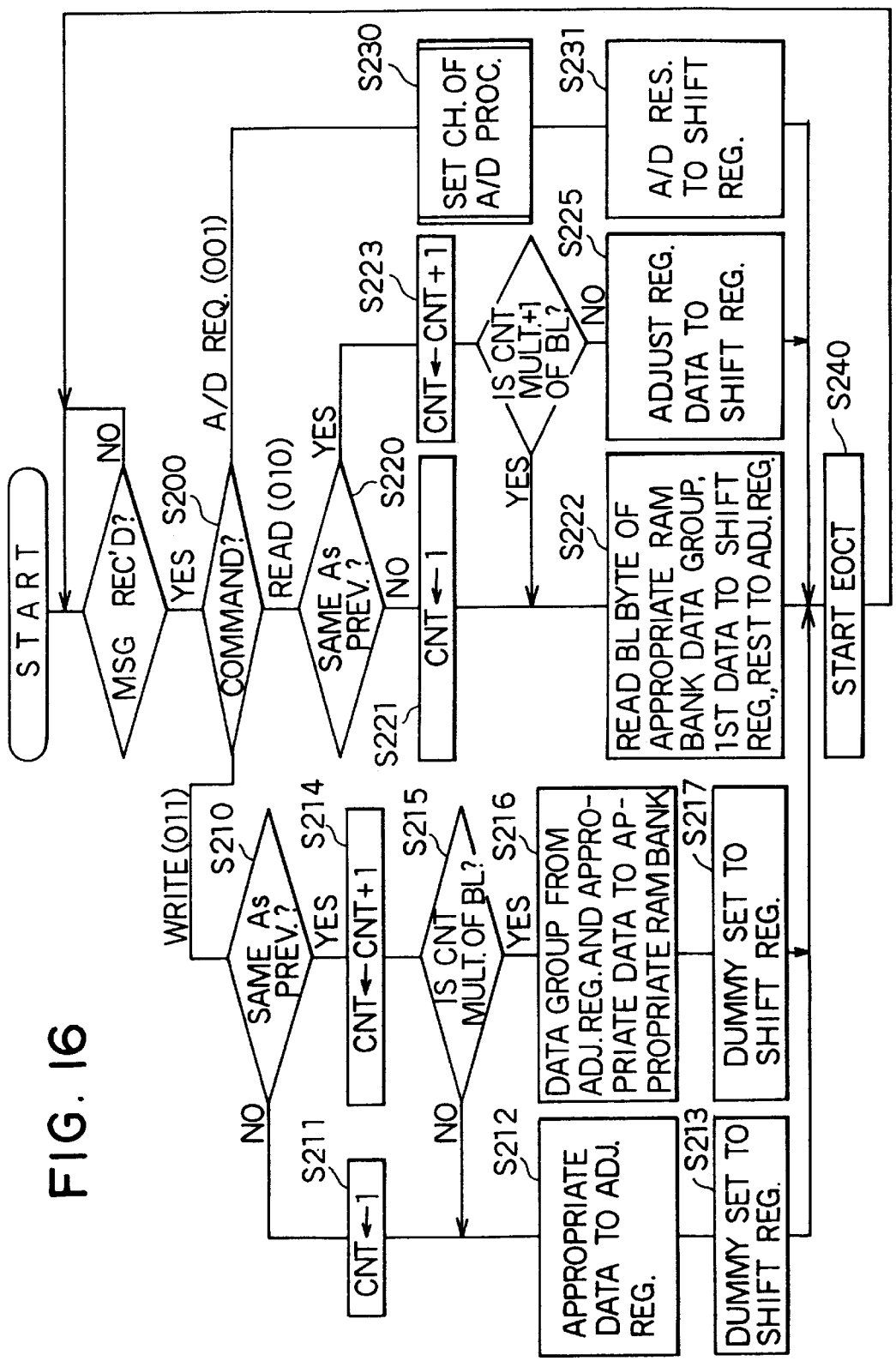
FIG. 16 is a flowchart showing an I/O control routine of this embodiment.

FIG. 16 shows an I/O control routine (actually, processing equivalent to this is achieved by logical operations of hardware) executed via the above-mentioned serial I/O controller 212 of this DMA controller 21', and a data-transfer configuration of the DMA control apparatus according to this embodiment will be described in greater detail below with reference also to FIG. 16.

As shown in FIG. 16, in this case as well, the serial I/O controller 212 constantly monitors the presence or absence a received message from the DMA controller 11 based on the state of the shift clock SCLK. Accordingly, when this received message arrives, in Step S200 an instruction contained therein (most significant 3 bits) is decoded, and based on the decoded instruction, processing of Step S210 and thereafter, of Step S220 and thereafter, or of Step S230 and thereafter is executed in correspondence with the above-described (A) Request for data write to RAM 23, (B) Request for data read from RAM 23, or (C) A/D-conversion request.

Namely, when the decoded instruction is taken to be a "request for data write to the RAM 23 (011)," in Step S210 the serial I/O controller 212 first determines whether the bank specified therewith is identical to the bank specified in the previous instance.

In a case where the specified bank has been determined as a result of this not to be identical to the bank specified in the previous instance, the serial I/O controller 212 sets a value of "1" in a counter CNT incorporated therein (Step S211), and temporarily loads data contained in the message to the data-set adjusting register 213 (Step S212).

Thereafter, dummy data are loaded into the shift register 211 (Step S213), the operation-complete signal EOCT goes high (Step S240), and this processing is ended for the time being.

Meanwhile, in a case where the specified bank is determined as a result of the foregoing specified-bank comparison to be identical to the bank specified in the previous instance, the serial I/O controller 212 increments the value of the counter CNT with a mode of "CNT<−CNT+1" (Step S214).

Accordingly, in the device according to this embodiment, it further is determined whether the value of this incremented counter CNT is a multiple of the byte-length information BL (Step S215), and when it is not a multiple, processing is transferred to the foregoing Step S212. That is, the data contained in the message are temporarily loaded into the data-set adjusting register 213 and the dummy data are loaded to the shift register 211, and thereafter the operation-complete signal EOCT goes high and this processing ends for the time being.

Meanwhile, when the value of the counter CNT was a multiple of the byte-length information BL, the data loaded into the data-set adjusting register 213 at that time and the data included in the message are block-written to the specified bank of the RAM 23 (Step S216).

Thereafter, similarly, dummy data are loaded to the shift register 211 (Step S217), the operation-complete signal EOCT goes high (Step S240), and this processing ends for the time being.

By repeating such write control via the DMA controller 21', each continuous byte-data group forming one information item among data making up, for example, the map data exemplified in FIGS. 4A and 4B is always written to the RAM 23 as a set.

Figure 17:
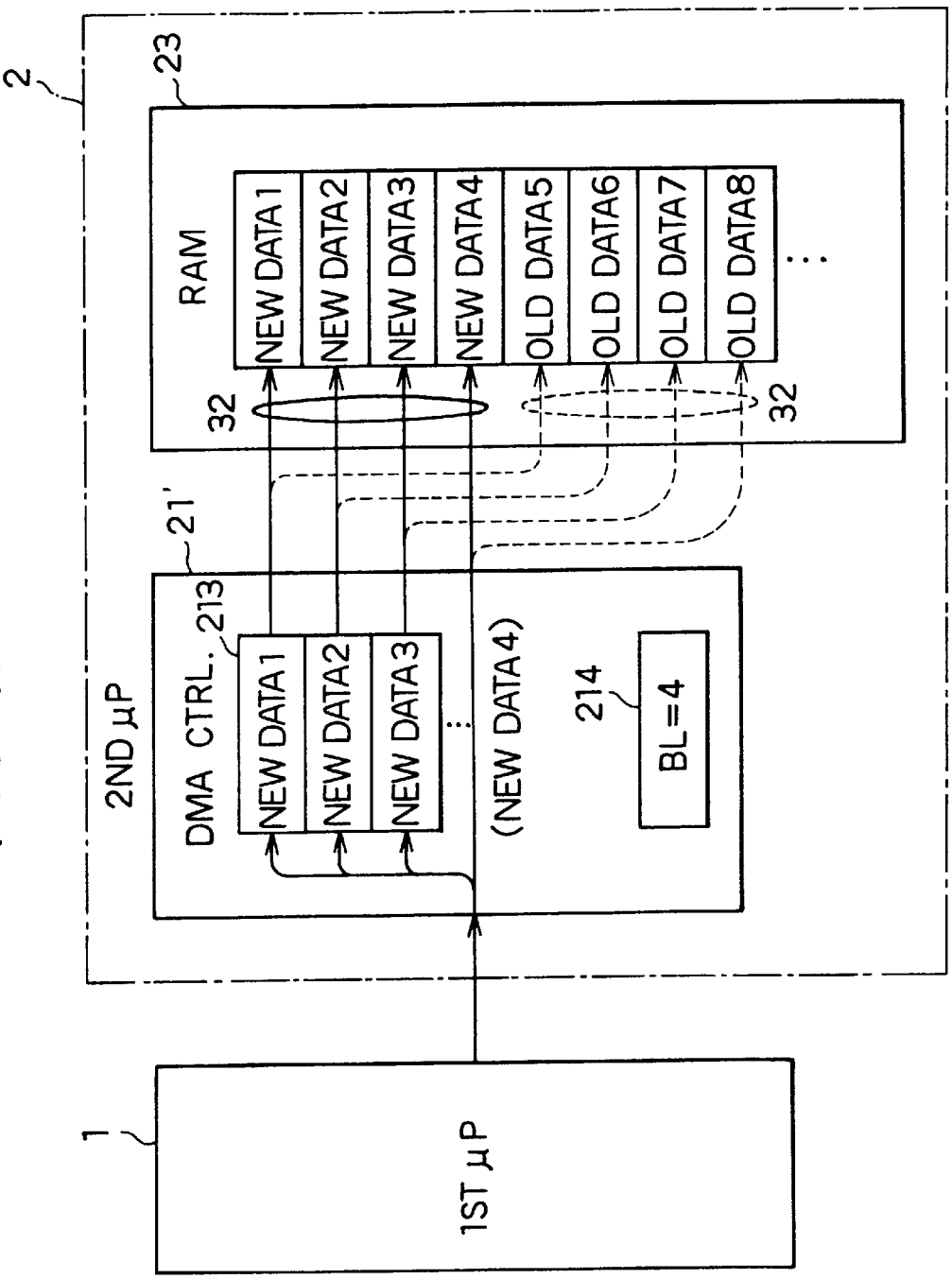
FIG. 17 is a schematic showing a typical data-write mode according to this I/O control.
Figure 18:
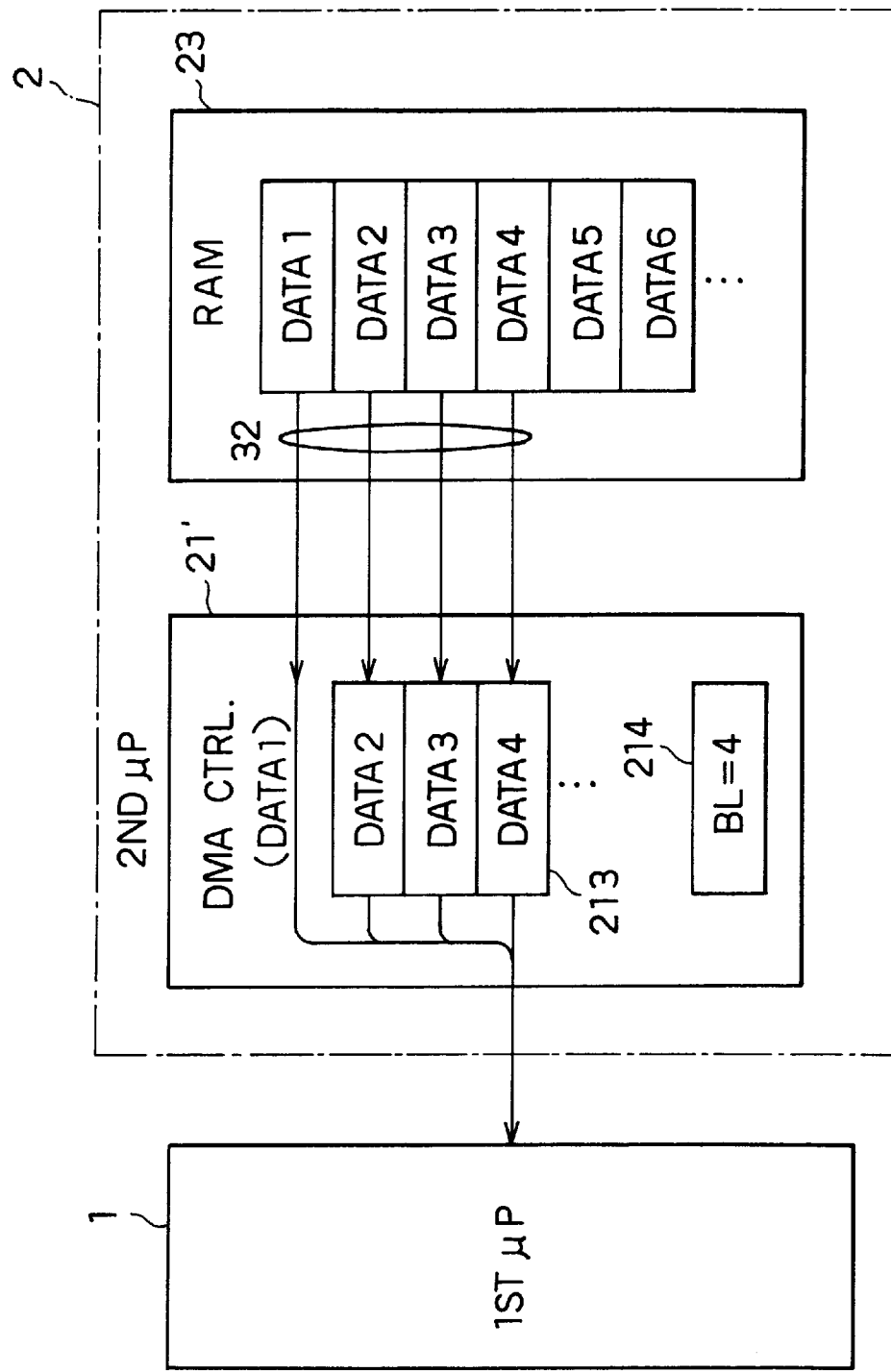
FIG. 18 is a schematic showing a typical data-read mode according to this I/O control.

For this reason, when, for example, the byte-length information BL stored in the byte-length memory 214 is "4," as is shown typically in FIG. 17, "new data 1" through "new data 3" are sequentially temporarily stored in the data-set adjusting register 213, and when "new data 4" is received, the 4-byte (32-bit) data set composed of "new data 1" through "new data 4" is written to the RAM 23. Consequently, even if word-unit access of the RAM 23 from the CPU 22 is performed, in this case as well fetching is performed correctly with no intermixing of "new data" and "old data."

When in the I/O control routine in FIG. 16 the above-described decoded instruction is taken to be a "request for data read from the RAM 23 (010)," in Step S220 the serial I/O controller 212 determines whether the bank specified therewith is identical to the bank specified in the previous instance.

In a case where the specified bank has been determined as a result of this not to be identical to the bank specified in the previous instance, the serial I/O controller 212 sets a value of "1" to the counter CNT incorporated therein (Step S221). Thereafter, the byte-length information BL stored in the byte-length memory 214 is referenced, and on a basis thereof, a data group (data set) of BL bytes is block-read from the specified bank in the RAM 23. Accordingly, the first datum thereof is loaded in the shift register 211, and the second and subsequent data are temporarily loaded in sequence into the above-described data-set adjusting register 213 (step S222).

Thereafter, the operation-complete signal EOCT goes high (Step S240), and this processing is ended for the time being.

Meanwhile, in a case where the specified bank is determined as a result of the foregoing specified-bank comparison to be identical to the bank specified in the previous instance, the serial I/O controller 212 increments the value of the counter CNT with a mode of "CNT<−CNT+1" (Step S223).

Accordingly, it further is determined whether the value of this incremented counter CNT is a "multiple+1" of the foregoing byte-length information BL (Step S224), and in a case where it is a "multiple+1" of the byte-length information BL, processing is transferred to the above-mentioned Step S222.

Meanwhile, in a case where the value of the counter CNT was not a "multiple+1" of the byte-length information BL, the second and later data loaded into the data-set adjusting register 213 at that time are loaded in sequence to the shift register 211 each time the same routine is repeated (Step S225).

Thereafter, similarly, the operation-complete signal EOCT goes high (Step S240), and this processing is ended for the time being.

By executing such read control via the DMA controller 21', byte data stored in the RAM 23 are block-read, in units of the data set thereof, to the DMA controller 21'.

For this reason, in a case where, for example, the byte-length information BL stored in the byte-length memory 214 is "4," as is shown in FIG. 17, each data set made up of 4 continuous bytes among the data stored in the RAM 23 is block-read to the DMA controller 21'. Consequently, in this case as well, no inconsistency occurs in these read data even in a case where these continuous data groups are simultaneously rewritten, for example, by word-unit access by the CPU 22.

In a case where in the I/O control routine of FIG. 16 as well the above-described decoded instruction is taken to be an "A/D-conversion request (001)," in Step S230 the specified A/D-conversion channel (ch) is selected and activation of the A/D converter 25 is performed, and in Step S231 the A/D-conversion results thereof are loaded in the shift register 211.

According to a DMA control apparatus according to this second embodiment, as has been described above, effects in addition to the effects of the above-described first embodiment and which are even more desirable as a DMA control apparatus are demonstrated, such as:

(e) Even with a data set made up of any number of bytes, block memory access of the data set is performed on condition that these data are available.

(f) Consequently, in this case as well, access with intermixing of data other than those of the data set is eliminated even in a case where asynchronous access of the RAM 23 of, for example, a word unit is performed from the CPU 22.

In this device according to the second embodiment, a method for setting the byte-length information BL stored in the byte-length memory 214 is discretionary, and memory access of a data set in even the above-described variable-length data is performed flexibly and with favorable efficiency by providing, at a minimum, for the byte-length information BL to be variably set from an external area.

Additionally, in this case, when employing a structure where, in particular, the byte-length information BL stored in the byte-length memory 214 is, prior to the above-described serially communicated data, transferred from the DMA controller 11 to the DMA controller 21' together with a suitable instruction as one of the serially communicated data and showing the same (for example, "111" or the like; an instruction differing from the several instructions of the foregoing (A) through (C)), and whenever the byte-length information BL is received, it is updated and recorded in the byte-length memory 214 by the serial I/O controller 212 of the DMA controller 21', the serial communication system can be used without modification to perform variable setting of the byte-length information BL even when no device is particularly provided for variably setting the byte-length information BL from an external area.

Furthermore, with this structure, it is sufficient to transfer the byte-length information BL only when varying the byte length of the data set to be transferred, and processing load thereof is greatly reduced at least in comparison with a case where a start datum and end datum are furnished.

In this case, also, the data to be transferred and the byte-length information BL are not intermixed because the byte-length information BL is sent by furnishing a separate instruction. That is, no restriction at all is additionally placed on values that can be used as data.

Meanwhile, the byte-length information BL established in the foregoing byte-length memory 214 may be fixed.

In this case, variable-length data cannot be handled, but block memory access is performed for the data set using an extremely simple structure for a system which performs data transfer in units of fixed byte length.

Although the present invention has been fully described in connection with the preferred embodiments thereof with reference to the accompanying drawings, it is to be noted that various changes and modifications will become apparent to those skilled in the art.

Figure 19:
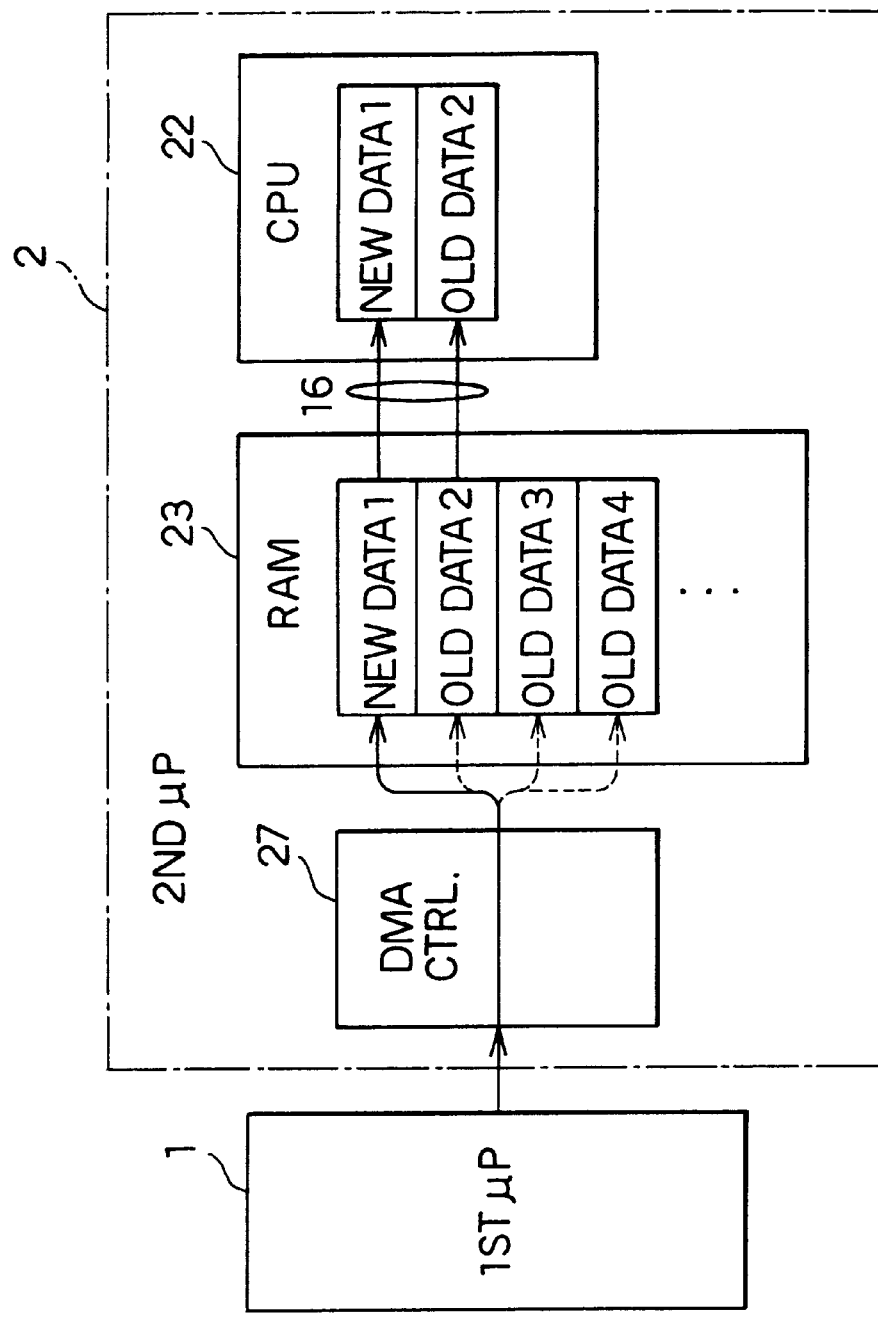
FIG. 19 is a schematic showing a typical data-write mode by DMA according to the prior art.
Figure 20:
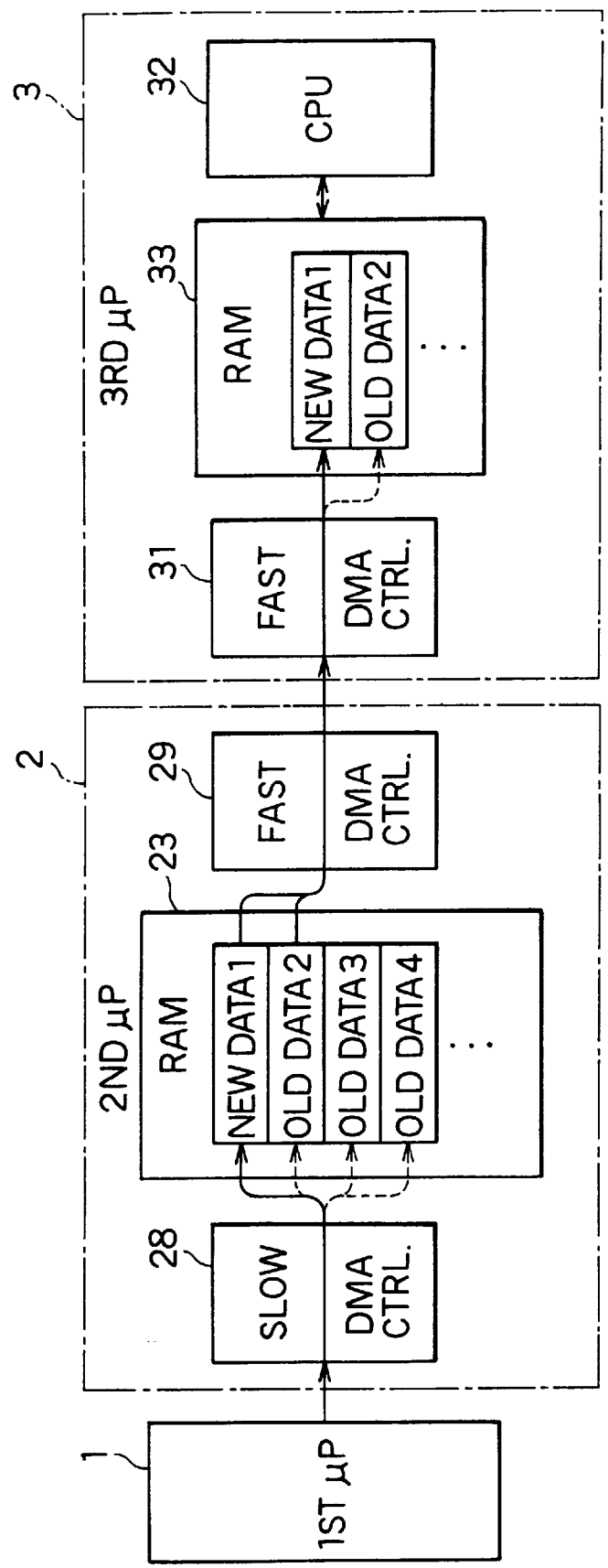
FIG. 20 is a schematic showing a typical data-write mode by DMA according to the prior art.

For example, for the sake of convenience in description, a case was described above where data intermixing is avoided, as is exemplified in FIG. 19, but it hardly need be said that the above-described structure of a DMA control apparatus according to this invention is effective even in a case where data transfer is performed among a still larger number of microprocessors via DMA controllers of differing processing speeds (i.e., communication speeds), as is shown in FIG. 20.

Furthermore, handshake communication by serial data was employed as a method of data communication (i.e., data exchange) in the devices of both of the above-described embodiments. For this reason, high-speed data communication based on less wiring (communication lines) is achieved. However, it is not the case that solely a communication method such as this is effective as the data-communication method. Other than this, for example, even a serial communication circuit or the like using what is termed a full-duplex communication interface, which returns sent data once the data has been received, may be employed if suitable.

Additionally, an electronic control unit of an engine for automotive use was employed as an example of a multiple-CPU system in the devices of both of the above-described embodiments, but a DMA control apparatus according to this invention is of course not exclusively restricted to such an engine-control system.

That is to say, a DMA control apparatus according to this invention can be applied in any other system, as long as it is a system which executes processing apportioned therein while asynchronously sharing an input/output device at a plurality of CPUs or memories.

Such changes and modifications are to be understood as being included within the scope of the present invention as defined by the appended claims.

What is claimed is:

1. A DMA control apparatus for transferring data between memories associated with two different asynchronously operating processors in a data set where one information item is formed by a plurality of data bytes bit-serially communicated in a predetermined byte pattern which includes data transmission commands to a memory, said apparatus comprising:
   a data-set adjusting register into which a number of data bits making up said data set minus one said bit-serially communicated data byte, are temporarily loaded; and
   controlling means for block-accessing said memory with said data set including data loaded into said data-set adjusting register and said one bit-serially communicated data byte.

2. A DMA control apparatus as in claim 1 wherein when one information item is formed by two bytes, said controlling means performs control while temporarily loading data received in odd order into said data-set adjusting register to block-write these data together with data received in even order to said memory.

3. A DMA control apparatus as in claim 1 wherein when said one information item is formed by two bytes, said controlling means block-reads said data set from said memory, and temporarily loads even-order data thereof into said data-set adjusting register, and after odd-order data have been sent, sends said loaded even-order data.

4. A DMA control apparatus as in claim 1 further comprising:
   a byte-length memory in which the number of data bits forming said data set is stored as byte-length information;
   wherein said controlling means temporarily loads data stored in said byte-length memory minus 1 into said data-set adjusting register, and block-accesses said memory with a data set including said loaded data and said bit-serially communicated data.

5. A DMA control apparatus as recited in claim 4, wherein said byte-length information stored in said byte-length memory is a fixed value.

6. A DMA control apparatus as recited in claim 5, wherein said controlling means, when said data are serially communicated in units of one byte and said byte-length information stored in said byte-length memory is n, where n is a natural number, while sequentially temporarily loading data received first up to nth−1 into said data-set adjusting register, block-writes said temporarily loaded data together with nth received data in said memory.

7. A DMA control apparatus as recited in claim 5, wherein said controlling means, when said data are serially communicated in units of one byte, and said byte-length information stored in said byte-length memory is n, where n is a natural number, after block-reading a data set of n bytes from said memory together with temporarily loading second through nth data thereof into said data-set adjustment register and sending first data thereof, sequentially sends said loaded second through nth data.

8. A DMA control apparatus for writing to and reading from a memory a data set where one information item is formed by a plurality of data serially communicated in a predetermined byte pattern, said apparatus comprising:

a data-set adjusting register into which data, a number thereof being a number of data making up said data set minus said serially communicated data, are temporarily loaded;

controlling means for block-accessing said memory with a data set being loaded into said data-set adjusting register and said serially communicated data; and a byte-length memory in which the number of data forming said data set is stored as byte-length information;

wherein said controlling means further temporarily loads data stored in said byte-length memory minus 1 into said data-set adjusting register, and for block accessing said memory with a data set being said loaded data and said serially communicated data; and wherein said byte-length information stored in said byte-length memory is a value settable from an external area.

9. A DMA control apparatus as recited in claim 8, wherein:

said byte-length information stored in said byte-length memory is transferred, prior to said serially communicated data, together with a suitable instruction as one of said serially communicated data; and said controlling means, whenever said byte-length data are received, updates and stores said byte-length data in said byte-length memory.

10. A DMA control apparatus as recited in claim 9, wherein said controlling means, when said data are serially communicated in units of one byte and said byte-length information stored in said byte-length memory is n, where n is a natural number, while sequentially temporarily loading data received first up to nth−1 into said data-set adjusting register, block-writes said temporarily loaded data together with nth received data in said memory.

11. A DMA control apparatus as recited in claim 9, wherein said controlling means, when said data are serially communicated in units of one byte, and said byte-length information stored in said byte-length memory is n, where n is a natural number, after block-reading a data set of n bytes from said memory together with temporarily loading second through nth data thereof into said data-set adjustment register and sending first data thereof, sequentially sends said loaded second through nth data.

12. A DMA control apparatus as recited in claim 8, wherein said controlling means, when said data are serially communicated in units of one byte and said byte-length information stored in said byte-length memory is n, where n is a natural number, while sequentially temporarily loading data received first up to nth−1 into said data-set adjusting register, block-writes said temporarily loaded data together with nth received data in said memory.

13. A DMA control apparatus as recited in claim 8, wherein said controlling means, when said data are serially communicated in units of one byte, and said byte-length information stored in said byte-length memory is n, where n is a natural number, after block-reading a data set of n bytes from said memory together with temporarily loading second through nth data thereof into said data-set adjustment register and sending first data thereof, sequentially sends said loaded second through nth data.

14. A DMA control apparatus as recited in claim 4, wherein said controlling means, when said data are serially communicated in units of one byte and said byte-length information stored in said byte-length memory is n, where n is a natural number, while sequentially temporarily loading data received first up to nth−1 into said data-set adjusting register, block-writes said temporarily loaded data together with nth received data in said memory.

15. A DMA control apparatus as recited in claim 4, wherein said controlling means, when said data are serially communicated in units of one byte, and said byte-length information stored in said byte-length memory is n, where n is a natural number, after block-reading a data set of n bytes from said memory together with temporarily loading second through nth data thereof into said data-set adjustment register and sending first data thereof, sequentially sends said loaded second through nth data.

16. A DMA control apparatus for writing to and reading from a memory a data set where one information item is formed by a plurality of data serially communicated in a predetermined byte pattern, said apparatus comprising:

a data-set adjusting register into which data, a number thereof being a number of data making up said data set minus said serially communicated data, are temporarily loaded; and controlling means for block-accessing said memory with a data set being loaded into said data-set adjusting register and said serially communicated data;

wherein said data are sent with bank data showing a storage region for storing added thereto;

determining means for determining, based on said bank data, a memory region for storing updated data, and data-transferring means for transferring received data into said data-set adjusting register based on a determination result of said determining means.

17. A DMA control apparatus as recited in claim 16, further comprising:

counting means for counting received data when received data have been determined by said determining means to be data to be stored in a same storage region;

wherein said data-transferring means transfers received data into said data-set adjusting register based on a count value of said counting means.

18. A DMA control apparatus as recited in claim 17, wherein said controlling means, when said data are serially communicated in units of one byte and said data set is such that one information item is formed by data of two bytes, performs control while temporarily loading data received in odd order into said data-set adjusting register to block-write these data together with data received in even order to said memory.

19. A DMA control apparatus as recited in claim 17, wherein said controlling means, when said data are serially communicated in units of one byte and when said data set is such that one information item is formed by data of two bytes, block-reads said data set from said memory, and temporarily loads even-order data thereof into said data-set adjusting register, and after odd-order data have been sent, sends said loaded even-order data.

20. A DMA control apparatus for writing to and reading from a memory a data set where one information item is formed by a plurality of data serially communicated in a predetermined byte pattern, said apparatus comprising:

a data-set adjusting register into which data, a number thereof being a number of data making up said data set minus said serially communicated data, are temporarily loaded;

controlling means for block-accessing said memory with a data set being loaded into said data-set adjusting register and said serially communicated data; and counting means for counting received data when received data have been determined by said determining means to be data to be stored in a same storage region;

wherein said data-transferring means transfers received data into said data-set adjusting register based on a count value of said counting means.

21. A DMA control apparatus as recited in claim 20, wherein said controlling means, when said data are serially communicated in units of one byte and said data set is such that one information item is formed by data of two bytes, performs control while temporarily loading data received in odd order into said data-set adjusting register to block-1581 write these data together with data received in even order to said memory.

22. A DMA control apparatus as recited in claim 20, wherein said controlling means, when said data are serially communicated in units of one byte and when said data set is such that one information item is formed by data of two bytes, block-reads said data set from said memory, and temporarily loads even-order data thereof into said data-set adjusting register, and after odd-order data have been sent, sends said loaded even-order data.

23. A DMA control apparatus for writing to and reading from a memory a data set where one information item is formed by a plurality of data serially communicated in a predetermined byte pattern, and said plurality of data including information for identification, said apparatus comprising:

a data-set adjusting register into which data, a number thereof being a number of data making up said data set minus said serially communicated data, are temporarily loaded;

counting means for counting a number of data being serially communicated;

controlling means for block-accessing said memory with a data set being loaded into said data-set adjusting register and said serially communicated data; and clearing means for clearing said counting means when said information for identification included in said data serially communicated does not coincide with a previous information for identification.

24. A DMA control apparatus for transferring data between memories associated with two different asynchronously operating processors in writing a data set, wherein one information item is formed by a plurality of N data communicated bit-serially in a predetermined byte pattern which includes data transmission commands, into a memory, said apparatus comprising:

a data-set adjusting register sized to store N–1 data and into which said communicated data is loaded temporarily every time when receiving said communicated data; and controlling means for retrieving said communicated plurality of N–1 data temporarily loaded in said data-set adjusting register and for block-transmitting said data set into said memory, at a time when communicated data corresponding to the Nth data of a whole data set is loaded into said data-set adjusting register.

25. A DMA control apparatus for transferring data between memories associated with two different asynchronously operating processors in reading a data set, wherein one information item is formed by a plurality of N data communicated bit-serially in a predetermined byte pattern which includes data transmission commands, from a memory, said apparatus comprising:

a data-set adjusting register sized to store N–1 data and into which said communicated data is temporarily loaded;

controlling means for block-retrieving a whole data set to be communicated from said memory at the time when a first data of said data set is communicated, N–1 data then to be temporarily loaded in said data-set adjusting register and for sequentially sending said N–1 data-set loaded in said data set adjusting register at a predetermined byte-length.

26. A DMA method for transferring data between memories associated with two different asynchronously operating processors in writing to and reading from a memory a data set where one information item is formed by a plurality of data bytes bit-serially communicated in a predetermined byte pattern which includes data transmission commands, said method comprising:

temporarily loading a data-set adjusting register with data making up said data set minus said serially communicated data;

block-accessing said memory with a data set comprising the data loaded into said data-set adjusting register and said serially communicated data.

27. A DMA method as in claim 26 wherein, when one information item is formed by data of two bytes, data received in odd order is temporarily loaded into said data-set adjusting register and these data together with data received in even order are thereafter block-written to said memory.

28. A DMA method as in claim 26 wherein, wwhen one information item is formed by data of two bytes, said data set is block-read from said memory, and even-order data thereof is temporarily loaded into said data-set adjusting register, and after odd-order data have been sent, said loaded even-order data is sent.

29. A DMA method as in claim 26 further comprising:

storing the number of data forming said data set as byte-length information;

temporarily loading data of a number being the value stored in said byte-length memory minus 1 into said data-set adjusting register, and block-accessing said memory with a data set being said loaded data and said serially communicated data.

30. A DMA method as in claim 29 wherein said byte-length information stored in said byte-length memory is a fixed value.

31. A DMA method as in claim 30 wherein, when said byte-length information stored in said byte-length memory is n, where n is a natural number, while sequentially temporarily loading data received first up to nth–1 into said data-set adjusting register, block-writing said temporarily loaded data together with nth received data in said memory.

32. A DMA method as in claim 30 wherein, when said byte-length information stored in said byte-length memory is n, where n is a natural number, after block-reading a data set of n bytes from said memory together with temporarily loading send through nth data thereof into said data-set adjustment register and sending first data thereof, sequentially sending said loaded second through nth data.

33. A DMA method for writing to and reading from a memory a data set where one information item is formed by a plurality of data bytes serially communicated in a predetermined byte pattern, said method comprising:
temporarily loading a data-set adjusting register with data making up said data set minus said serially communicated data;
block-accessing said memory with a data set comprising the data loaded into said data-set adjusting register and said serially communicated data;
storing the number of data forming said data set as byte-length information; and
temporarily loading data of a number being the value stored in said byte-length memory minus 1 into said data-set adjusting register, and block-accessing said memory with a data set being said loaded data and said serially communicated data;
wherein said byte-length information stored in said byte-length memory is a value settable from an external area.

34. A DMA method as in claim 33, wherein:
said byte-length information stored in said byte-length memory is transferred, prior to said serially communicated data, together with a suitable instruction as one of said serially communicated data; and
whenever said byte-length data are received, said byte-length data is updated and stored in said byte-length memory.

35. A DMA method as in claim 34 wherein, when said data are serially communicated in units of one byte and said byte-length information stored in said byte-length memory is n, where n is a natural number, while sequentially temporarily loading data received first up to nth−1 into said data-set adjusting register, block-writing said temporarily loaded data together with nth received data in said memory.

36. A DMA method as in claim 34 wherein, when said data are serially communicated in units of one byte, and said byte-length information stored in said byte-length memory is n, where n is a natural number, after block-reading a data set of n bytes from said memory together with temporarily loading second through nth data thereof into said data-set adjustment register and sending first data thereof, sequentially sending said loaded second through nth data.

37. A DMA method as in claim 33 wherein, when said data are serially communicated in units of one byte and said byte-length information stored in said byte-length memory is n, where n is a natural number, while sequentially temporarily loading data received first up to nth−1 into said data-set adjusting register, block-writing said temporarily loaded data together with nth received data in said memory.

38. A DMA method as in claim 33 wherein, when said data are serially communicated in units of one byte, and said byte-length information stored in said byte-length memory is n, where n is a natural number, after block-reading a data set of n bytes from said memory together with temporarily loading second through nth data thereof into said data-set adjustment register and sending first data thereof, sequentially sending said loaded second through nth data.

39. A DMA method as in claim 29 wherein, when said data are serially communicated in units of one byte and said byte-length information stored in said byte-length memory is n, where n is a natural number, while sequentially temporarily loading data received first up to nth−1 into said data-set adjusting register, block-writing said temporarily loaded data together with nth received data in said memory.

40. A DMA method as in claim 29 wherein, when said data are serially communicated in units of one byte, and said byte-length information stored in said byte-length memory is n, where n is a natural number, after block-reading a data set of n bytes from said memory together with temporarily loading second through nth data thereof into said data-set adjustment register and sending first data thereof, sequentially sending said loaded second through nth data.

41. A DMA method for writing to and reading from a memory a data set where one information item is formed by a plurality of data bytes serially communicated in a predetermined byte pattern, said method comprising:
temporarily loading a data-set adjusting register with data making up said data set minus said serially communicated data;
block-accessing said memory with a data set comprising the data loaded into said data-set adjusting register and said serially communicated data;
wherein said data are sent with bank data showing a storage region for storing added thereto and further comprising:
determining, based on said bank data, a memory region for storing updated data, and
transferring received data into said data-set adjusting register based on said determination result.

42. A DMA method as in claim 41 further comprising:
counting received data when received data have been determined to be data to be stored in a same storage region; and
transferring received data into said data-set adjusting register based on such count value.

43. A DMA method as in claim 42 wherein, when said data are serially communicated in units of one byte and said data set is such that one information item is formed by data of two bytes, while temporarily loading data received in odd order into said data-set adjusting register, block-writing these data together with data received in even order to said memory.

44. A DMA method as in claim 42 wherein, when said data are serially communicated in units of one byte and when said data set is such that one information item is formed by data of two bytes, block-reading said data set from said memory, and temporarily loading even-order data thereof into said data-set adjusting register, and after odd-order data have been sent, sending said loaded even-order data.

45. A DMA method for writing to and reading from a memory a data set where one information item is formed by a plurality of data bytes serially communicated in a predetermined byte pattern said method comprising:
temporarily loading a data-set adjusting register with data making up said data set minus said serially communicated data;
block-accessing said memory with a data set comprising the data loaded into said data-set adjusting register and said serially communicated data;
counting received data when received data have been determined to be data to be stored in a same storage region; and
transferring received data into said data-set adjusting register based on such count value.

46. A DMA method as in claim 45 wherein, when said data are serially communicated in units of one byte and said data set is such that one information item is formed by data of two bytes, while temporarily loading data received in odd order into said data-set adjusting register, block-writing these data together with data received in even order to said memory.

47. A DMA method for writing to and reading from a memory a data set where one information item is formed by a plurality of data bytes serially communicated in a predetermined byte pattern, said method comprising:

temporarily loading a data-set adjusting register with data making up said data set minus said serially communicated data;

block-accessing said memory with a data set comprising the data loaded into said data-set adjusting register and said serially communicated data;

counting received data when received data have been determined to be data to be stored in a same storage region; and transferring received data into said data-set adjusting register based on such count value;

wherein, when said data are serially communicated in units of one byte and when said data set is such that one information item is formed by data of two bytes, block-reading said data set from said memory, and temporarily loading even-order data thereof into said data-set adjusting register, and after odd-order data have been sent, sending said loaded even-order data.

48. A DMA method for writing to and reading from a memory a data set where one information item is formed by a plurality of data serially communicated in a predetermined byte pattern, and said plurality of data including information for identification, said method comprising:

temporarily loading into a data-set adjusting register data, a number thereof being a number of data making up said data set minus said serially communicated data;

counting a number of data being serially communicated;

block-accessing said memory with a data set being loaded into said data-set adjusting register and said serially communicated data; and clearing said counting step when said information for identification included in said data serially communicated does not coincide with a previous information for identification.

49. A DMA method for transferring data between memories associated with two different asynchronously operating processors in writing a data set, wherein one information item is formed by a plurality of N data including data transmission commands communicated bit serially in a predetermined byte pattern, into a memory, said method comprising:

temporarily loading into a data-set adjusting register N−1 of said communicated data every time when receiving said communicated data; and retrieving said communicated N−1 plurality of data temporarily loaded in said dataset adjusting register and block-transmitting said data set into said memory, at a time when communicated data corresponding to the Nth data of a whole data set is loaded into said data-set adjusting register.

50. A DMA method for transferring data between memories associated with two different asynchronously operating processors in reading a data set, wherein one information item is formed by a plurality of N data including data transmission commands communicated bit serially in a predetermined byte pattern, from a memory, said method comprising:

temporarily loading N−1 of said communicated data into a data-set adjusting register;

block-retrieving a whole data set to be communicated from said memory at the time when a first data of said data set is communicated, N−1 data then to be temporarily loaded in said data-set adjusting register and sequentially sending said N−1 data-set loaded in said data set adjusting register at a predetermined byte-length.

* * * * *